US008625922B2

(12) United States Patent
Ogura

(10) Patent No.: US 8,625,922 B2
(45) **Date of Patent: *Jan. 7, 2014**

(54) IMAGE PROCESSING METHOD AND PROGRAM FOR DETERMINING WHETHER SABOTAGE HAS OCCURRED TO AN IMAGE

(75) Inventor: Sho Ogura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,201

(22) Filed: Aug. 2, 2012

(65) Prior Publication Data

US 2013/0044964 A1 Feb. 21, 2013

(30) Foreign Application Priority Data

Aug. 15, 2011 (JP) ................................ 2011-177569

(51) Int. Cl.
*G06K 9/40* (2006.01)
*G06K 9/00* (2006.01)

(52) U.S. Cl.
USPC .......................................................... 382/260

(58) Field of Classification Search
USPC ................ 382/164, 167, 168, 170–173, 190, 382/218–220, 224, 260–264, 275; 358/509, 358/515, 518, 520, 522, 523; 345/426, 581, 345/613; 375/240.02, 240.12; 348/672, 687
See application file for complete search history.

(56) References Cited

U.S. PATENT DOCUMENTS

| | | | | |
|---|---|---|---|---|
| 5,359,369 | A * | 10/1994 | Izawa et al. | 348/672 |
| 6,741,295 | B2 * | 5/2004 | Nieuwenhuizen et al. | 348/687 |
| 7,079,157 | B2 * | 7/2006 | Deering | 345/613 |
| 7,245,764 | B2 * | 7/2007 | Nishizawa | 382/168 |
| 2003/0034974 | A1 * | 2/2003 | Welch et al. | 345/426 |
| 2003/0052890 | A1 * | 3/2003 | Raskar et al. | 345/581 |
| 2008/0219564 | A1 * | 9/2008 | Covell et al. | 382/224 |
| 2009/0297038 | A1 * | 12/2009 | Ishikawa et al. | 382/209 |
| 2010/0208982 | A1 * | 8/2010 | Shimamura et al. | 382/154 |
| 2011/0229030 | A1 * | 9/2011 | Ogura | 382/170 |
| 2012/0155764 | A1 * | 6/2012 | Ogura | 382/171 |
| 2013/0044964 | A1 * | 2/2013 | Ogura | 382/260 |

FOREIGN PATENT DOCUMENTS

| | | |
|---|---|---|
| JP | 4227539 | 12/2008 |
| JP | 4626632 | 11/2010 |

OTHER PUBLICATIONS

U.S. Appl. No. 13/565,210, Ogura.

* cited by examiner

*Primary Examiner* — Amir Alavi

(74) *Attorney, Agent, or Firm* — Oblon, Spivak, McClelland, Maier & Neustadt, L.L.P.

(57) ABSTRACT

There is provided an image processing device including an acquisition portion that acquires image data of an image, a dividing portion that divides the acquired image into a number of blocks N (N>1), a specification portion that sequentially specifies, each time the image data of the image is newly acquired, a number of the blocks M (N≥M>1) from among the number of the blocks N, as the blocks to be updated, a filtering portion that performs filtering using a predetermined filter on the image data of the specified number of the blocks M, a counting portion that counts a number of pixels for which a filtering result is larger than a predetermined value, a first determination portion that determines whether there is an abnormality in the blocks, and a second determination portion that determines whether sabotage has occurred.

6 Claims, 20 Drawing Sheets

FIG. 18

| PRESENCE OR ABSENCE OF SABOTAGE | | GLOBAL CHANGE (HISTOGRAM ABNORMALITY) | | |
| --- | --- | --- | --- | --- |
| | | NO | YES (LUMINANCE CHANGING IN SAME DIRECTION) | YES (LUMINANCE CHANGING IN PLURALITY OF DIRECTIONS) |
| DEFOCUSING (EDGE STRENGTH ABNORMALITY) | NO | NO ABNORMALITY | TURNING OF SURVEILLANCE CAMERA | |
| | YES | FOCUS BLURRING | COVERING (LIGHTING ON/OFF) | ZOOM BLURRING |

IMAGE PROCESSING METHOD AND PROGRAM FOR DETERMINING WHETHER SABOTAGE HAS OCCURRED TO AN IMAGE

BACKGROUND

The present technology relates to an image processing device, an image processing method and a program. More specifically, the present technology relates to an image processing device, an image processing method and a program that can detect an act of sabotage committed on a surveillance camera or the like.

A surveillance system is known in which, in order to detect an intruder, such as a person or an animal, in a specific space, images are captured of a targeted space by a surveillance camera, and the intruder is detected from the captured images. In this surveillance system, if an act of sabotage is committed, such as covering the surveillance camera with a cloth, changing an orientation of the surveillance camera or spraying a lens of the surveillance camera, it is no longer possible to perform surveillance.

Technology to detect an act of sabotage against a surveillance camera is proposed, in which a degree of similarity is calculated between a current image being filmed by the surveillance camera and a reference image (or a past image) that is stored in advance, or edge strength is calculated and so on, in order to determine whether or not there has been an act of sabotage (refer to Japanese Patent No. 04626632 and Japanese Patent No. 04227539, for example).

SUMMARY

According to Japanese Patent No. 04626632 and Japanese Patent No. 04227539, it is possible to detect that there has been an act of sabotage. However, it is difficult to determine the type of sabotage. By making it possible to determine the type of sabotage, a response to resolve the sabotage is different, and it is therefore preferable to be able to determine the type of sabotage in addition to detection.

Further, in Japanese Patent No. 04626632, processing is disclosed that also includes moving body detection processing to inhibit mistaken detection due to a moving body. However, detection is not possible except in such a scenario as when the moving body covers a whole screen, and it is difficult to perform detection with respect to a more detailed situation.

Further, in Japanese Patent No. 04227539, it is proposed that processing is performed for each of regions. However, when determining whether or not there has been an act of sabotage, values of results for all regions are added and an overall value is calculated. Thus, when edge strength is extremely high in some regions, a determination result is dependent on those regions, and there is a risk of a mistaken determination.

There is demand for a system that can more accurately detect an act of sabotage against a surveillance camera without mistaken detection, that can determine the type of sabotage, and that allows an appropriate and rapid response.

The present technology has been devised in light of the foregoing circumstances and makes it possible to accurately detect sabotage that is committed against a surveillance camera or the like, and that further makes it possible to determine the type of the sabotage.

According to an embodiment of the present technology, there is provided an image processing device including: an acquisition portion that acquires image data of an image; a dividing portion that divides the acquired image into a number of blocks N (N>1); a specification portion that sequentially specifies, each time the image data of the image is newly acquired, a number of the blocks M (N≥M>1) from among the number of the blocks N, as the blocks to be updated; a filtering portion that performs filtering using a predetermined filter on the image data of the specified number of the blocks M; a counting portion that counts a number of pixels for which a filtering result is larger than a predetermined value; a first determination portion that determines whether there is an abnormality in the blocks, by comparing the number of the pixels counted by the counting portion with a predetermined value; and a second determination portion that determines whether sabotage has occurred, by comparing, with a predetermined value, a number of the blocks within the image that are determined by the first determination portion to have an abnormality.

The counting portion may calculate an average value by dividing a sum value of the number of pixels obtained by counting the number of the pixels for which the filtering result is larger than the predetermined value, and a value of pixels for which it is determined that the filtering result is equal to or larger than the predetermined value, by the number of pixels. The first determination portion may perform a first determination that determines whether the number of pixels is smaller than a predetermined value, and a second determination that determines whether the average value is smaller than a predetermined value, and may set a logical sum of the first determination and the second determination as a determination result.

The image processing device may further include: a histogram generation portion that generates a histogram of the image data of each of the specified number of the blocks M; a histogram storage portion that sequentially updates and stores the generated histogram; a change determination portion that, based on a degree of similarity between the generated histogram of each of the specified number of the blocks M and the corresponding stored past histogram of the number of the blocks M, determines whether there is a change in the acquired image; a normalization determination portion that determines whether to perform normalization of the histogram; and a normalization portion that, when it is determined by the normalization determination portion that normalization is to be performed, performs normalization of one of the generated histogram of the number of the blocks M or the corresponding stored past histogram of the number of the blocks M. When the normalization of the histogram has been performed by the normalization portion, the change determination portion may determine whether there is a change in the acquired image based on a degree of similarity using the normalized histogram, and may determine that sabotage has occurred when it is determined that there is a change.

A determination result by the second determination portion and a determination result by the change determination portion may be integrated and a type of the sabotage may be determined.

According to another embodiment of the present technology, there is provided an image processing method which includes: acquiring image data of an image; dividing the acquired image into a number of blocks N (N>1); sequentially specifying, each time the image data of the image is newly acquired, a number of the blocks M (N≥M>1) from among the number of the blocks N, as the blocks to be updated; performing filtering using a predetermined filter on the image data of the specified number of the blocks M; counting a number of pixels for which a filtering result is larger than a predetermined value; determining whether there is an abnormality in the blocks, by comparing the counted number of the pixels with a predetermined value; and determining whether sabotage has occurred, by comparing, with a predetermined value, a number of the blocks within the image that are determined to have an abnormality.

According to another embodiment of the present technology, there is provided a computer-readable program including instructions that command a computer to perform: acquiring image data of an image; dividing the acquired image into a number of blocks N (N>1); sequentially specifying, each time the image data of the image is newly acquired, a number of the blocks M (N≥M>1) from among the number of the blocks N, as the blocks to be updated; performing filtering using a predetermined filter on the image data of the specified number of the blocks M; counting a number of pixels for which a filtering result is larger than a predetermined value; determining whether there is an abnormality in the blocks, by comparing the counted number of the pixels with a predetermined value; and determining whether sabotage has occurred, by comparing, with a predetermined value, a number of the blocks within the image that are determined to have an abnormality.

With the image processing device, the image processing method and the program according to the embodiments of the present technology, an acquired image is divided into a number of blocks N (N>1), and each time the image data of the image is newly acquired, a number of the blocks M (N≥M>1) from among the number of the blocks N is sequentially specified as the blocks to be updated. Filtering is performed, using a predetermined filter, on the image data of the specified number of the blocks M, and a number of pixels for which a filtering result is larger than a predetermined value is counted. The counted number of the pixels is compared with a predetermined value and thus it is determined whether there is an abnormality in the blocks. Then, a number of the blocks within the image that are determined to have an abnormality is further compared with a predetermined value and it is thus determined whether sabotage has occurred.

According to the embodiments of the present technology described above, when an act of sabotage is committed against a surveillance camera or the like, the sabotage can be accurately detected. Further, the type of the sabotage can be determined. By making it possible to determine the type of the sabotage, it is easy for a user to take appropriate action to resolve the sabotage.

BRIEF DESCRIPTION OF THE DRAWINGS

FIG. 18 is a diagram illustrating integration of detection results;

DETAILED DESCRIPTION OF THE EMBODIMENT(S)

Hereinafter, preferred embodiments of the present disclosure will be described in detail with reference to the appended drawings.

Configuration of Image Processing Device

Figure 1:
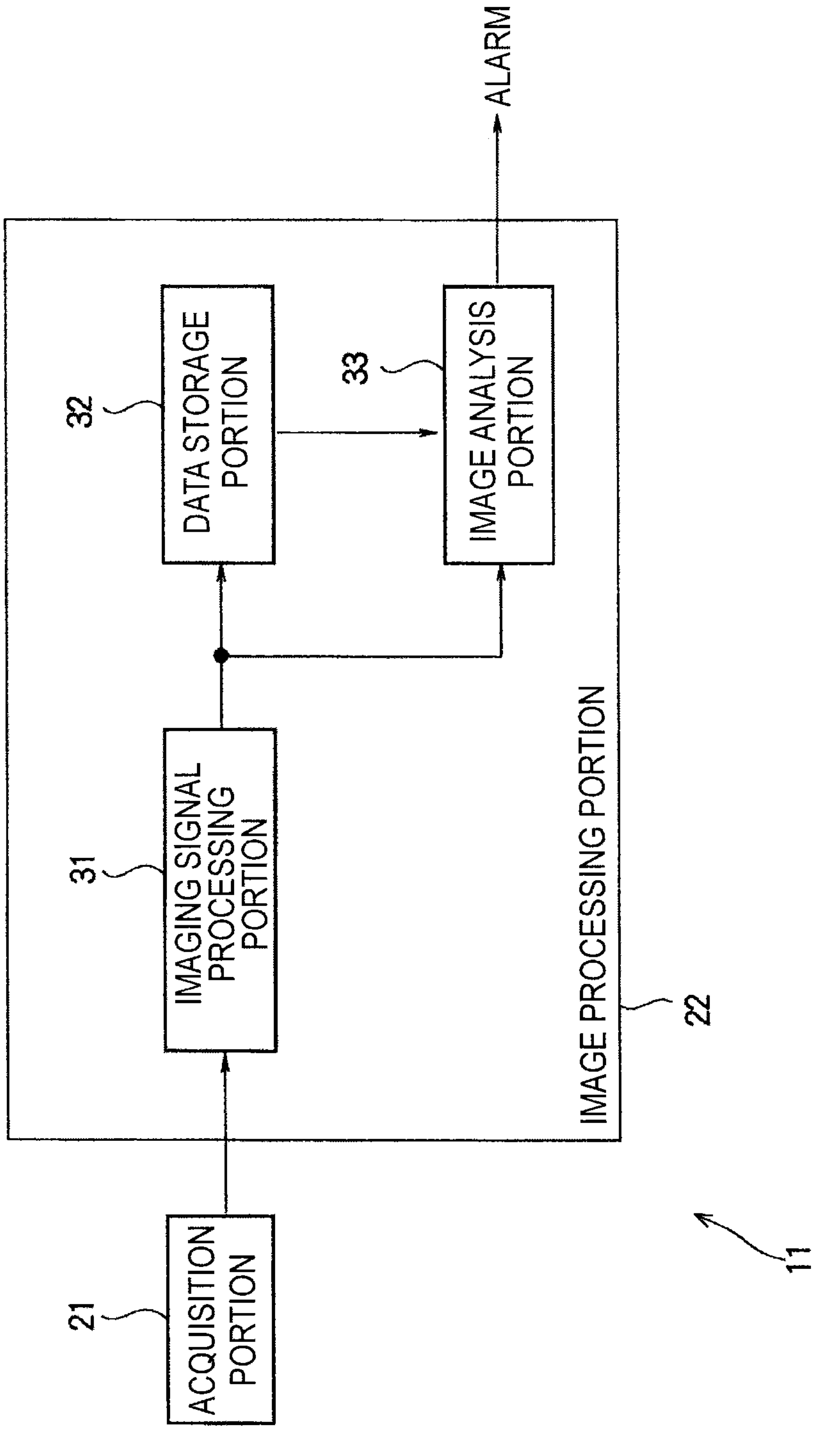
FIG. 1 is a block diagram showing a configuration of an image processing device according to an embodiment of the present technology.

FIG. 1 is a block diagram showing a configuration of an image processing device according to an embodiment of the present technology. The present technology is applied to a device that analyzes an image captured by a surveillance camera and detects sabotage committed against the surveillance camera. An image processing device 11 shown in FIG. 1 detects an act of sabotage against a surveillance camera (surveillance device) based on the captured image, and outputs an alarm when the act of sabotage is detected.

Here, the sabotage with respect to the surveillance camera will be explained. Sabotage against the surveillance camera includes sabotage in which a surveillance target is removed from a field of view (such that it is outside a range of capture). This type of sabotage includes "turning" in which an orientation of the surveillance camera is changed, and "covering" in which the surveillance camera is covered with a cloth or the like. Here, this type of sabotage, in which the surveillance target is removed from the field of view, is referred to as a global change.

In addition, there is sabotage in which a focus of the surveillance camera is blurred. This type of sabotage includes "focus blurring" in which the focus of the surveillance camera is changed, and "zoom blurring" in which the zoom of the surveillance camera is put out of focus. This type of sabotage, in which the focus is changed, is referred to here as defocus or defocusing.

The image processing device 11 shown in FIG. 1 includes an acquisition portion 21 and an image processing portion 22. The acquisition portion 21 is a unit that acquires image data of an image. The acquisition portion 21 has a built-in complementary metal oxide semiconductor (CMOS) sensor and an imaging portion, such as a video camera, and acquires and outputs image data obtained by capturing images of a subject, such as a target space, that is under surveillance by the imaging portion. The acquisition portion 21 can also acquire image data supplied from an external source via a network.

The image processing portion 22 includes an imaging signal processing portion 31, a data storage portion 32 and an image analysis portion 33. The imaging signal processing portion 31 performs various types of image processing on the image data acquired by the acquisition portion 21, such as black level correction processing, white balance processing, gamma correction processing and color correction processing.

The imaging signal processing portion 31 is, for example, a digital signal processor (DSP). The data storage portion 32 stores the image data processed by the imaging signal processing portion 31. The data storage portion 32 is, for example, a random access memory (RAM). The image analysis portion 33 detects an act of sabotage by analyzing a current image supplied from the imaging signal processing portion 31 and a reference image that is a past image supplied from the data storage portion 32. The image analysis portion 33 is, for example, a central processing unit (CPU).

Detailed Configuration of the Image Analysis Portion 33

Figure 2:
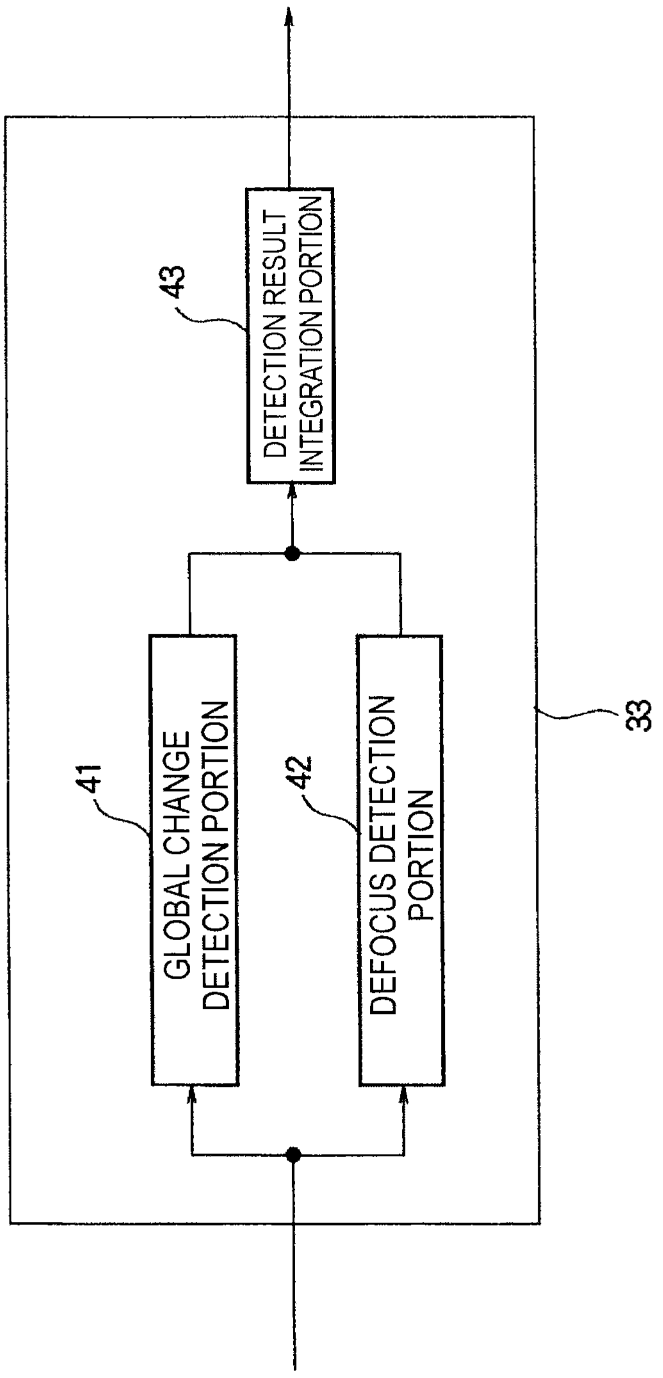
FIG. 2 is a block diagram showing a configuration of an image analysis portion.

FIG. 2 is a diagram showing an internal configuration of the image analysis portion 33. The image analysis portion 33 includes a global change detection portion 41, a defocus detection portion 42 and a detection result integration portion 43. The global change detection portion 41 performs processing that detects the above-described global change sabotage. The defocus detection portion 42 performs processing that detects the above-described defocusing sabotage. The detection result integration portion 43 integrates detection results respectively output from the global change detection portion 41 and the defocus detection portion 42, and determines the type of the act of sabotage against the surveillance camera.

Detailed Configuration of the Global Change Detection Portion 41

Figure 3:
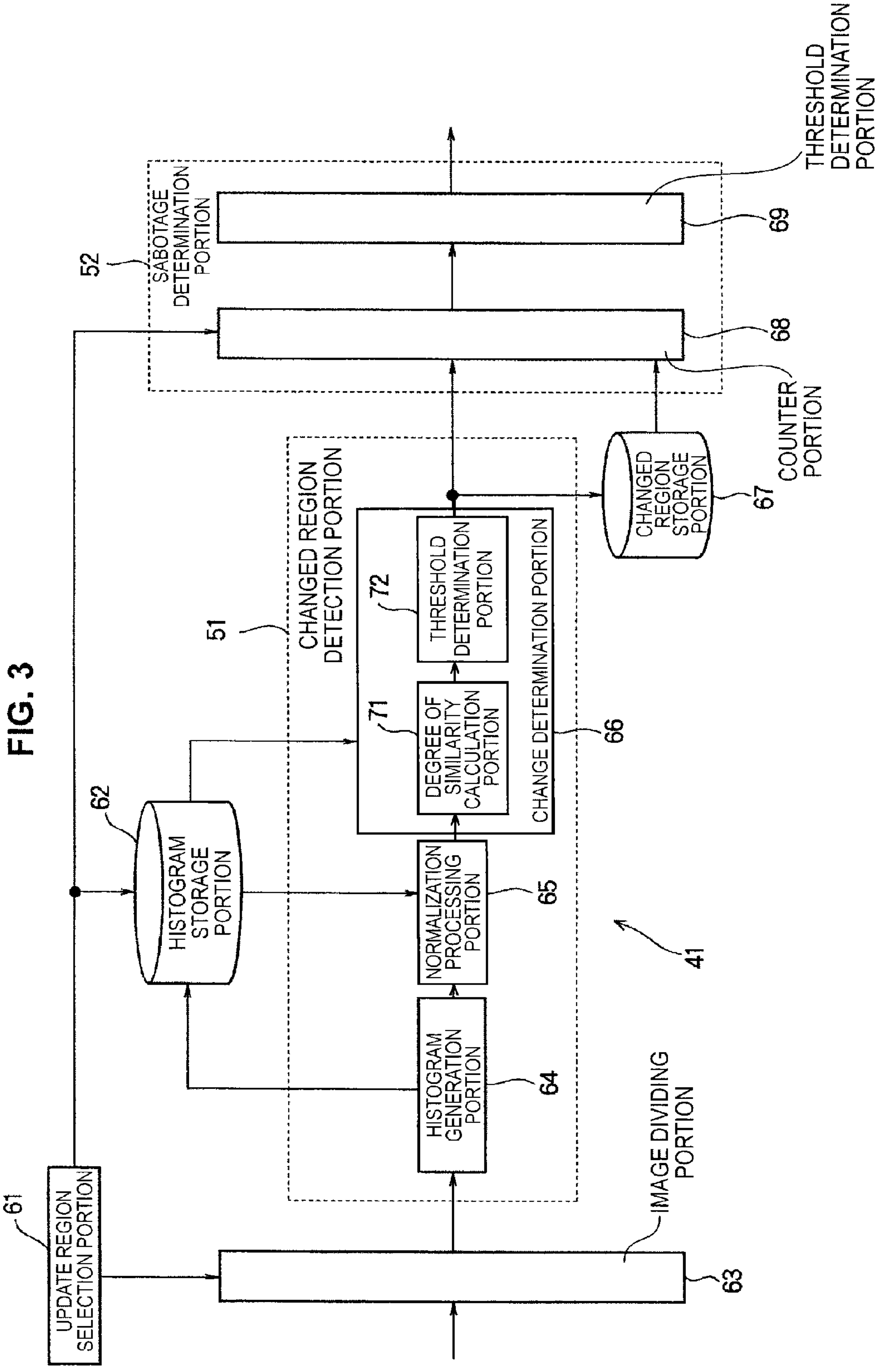
FIG. 3 is a block diagram showing a detailed configuration example of a global change detection portion.

FIG. 3 is a block diagram showing an example of a detailed configuration of the global change detection portion 41. The global change detection portion 41 includes an update region selection portion 61, a histogram storage portion 62, an image dividing portion 63, a histogram generation portion 64, a normalization processing portion 65, a change determination portion 66, a changed region storage portion 67, a counter portion 68 and a threshold determination portion 69.

The update region selection portion 61 functions as a specifying unit that sequentially specifies, each time image data of a new image is acquired, a number of blocks M from among a number of blocks N (N≥M>1) as blocks to be updated. From data supplied from the imaging signal processing portion 31, the update region selection portion 61 extracts a frame number of an image acquired by the acquisition portion 21 and decides a frame number to be updated. Further, the update region selection portion 61 decides a block to be updated in the frame to be updated.

The image dividing portion 63 is a unit that divides the acquired image into the number of blocks N (N>1). Of the images of each frame based on the image data supplied from the imaging signal processing portion 31, the image dividing portion 63 divides the frame specified by the update region selection portion 61 into a plurality of blocks. The image dividing portion 63 further, of the divided blocks, supplies to the histogram generation portion 64 image data of the blocks specified by the update region selection portion 61.

The histogram generation portion 64 is a histogram generating unit that generates a histogram of the acquired image data, and generates a histogram of each of the blocks supplied from the image dividing portion 63. Note that sometimes the imaging signal processing portion 31 is provided with a histogram generating function. In this case, the histogram generation portion 64 can be provided inside the imaging signal processing portion 31.

The histogram storage portion 62 is a histogram storage unit that sequentially updates and stores the generated histogram, and updates the histogram of each of the blocks specified as an update region by the update region selection portion 61. Specifically, a histogram of a block corresponding to a past frame that is already stored is overwritten by a histogram of an update target block of a current frame supplied from the histogram generation portion 64.

The normalization processing portion 65 normalizes the histogram of each of the blocks as necessary. The histogram generation portion 64 supplies the histogram of each of the update target blocks of the current frame to the normalization processing portion 65. Further, the histogram storage portion 62 supplies to the normalization processing portion 65 the past histogram corresponding to each of the blocks supplied from the histogram generation portion 64. The normalization processing portion 65 determines whether or not it is necessary to normalize the histogram relating to each of the update target blocks of the current frame supplied from the histogram generation portion 64, and performs normalization as necessary. It should be noted that a determination as to whether the histogram of the update target block of the current frame is normalized or the histogram of the corresponding past block is normalized is performed in accordance with a condition of the histograms.

The change determination portion 66 is a change determination unit that determines a change of the acquired image. The change determination portion 66 performs change determination processing based on a degree of similarity between the generated current histogram and the stored past histogram. The change determination portion 66 includes a degree of similarity calculation portion 71 and a threshold determination portion 72.

The degree of similarity calculation portion 71 functions as a degree of similarity calculation unit that calculates a degree of similarity between the current histogram and the past histogram. Specifically, the degree of similarity calculation portion 71 calculates the degree of similarity between the histogram of each of the update target blocks of the current frame supplied from the histogram generation portion 64 and the histogram of each of the corresponding past blocks.

The threshold determination portion 72 is a unit that determines a degree of similarity threshold value. The threshold determination portion 72 compares the calculated degree of similarity with the degree of similarity threshold value and determines, when the degree of similarity is larger than the degree of similarity threshold value, whether or not there has been a change in the image of the blocks. The threshold determination portion 72 outputs a determination result with respect to changes of the image of the blocks (presence or absence of change) to the changed region storage portion 67 and the counter portion 68.

The changed region storage portion 67 stores the result of the determination by the change determination portion 66. Specifically, the presence or absence of change in the update target block of the current frame with respect to the past block is sequentially stored in the changed region storage portion 67 each time the image data of the new image is acquired.

The counter portion 68 is a counting unit that counts a number of the blocks in which it is determined that there has been a change. The change determination portion 66 supplies the determination result (the presence or absence of change) of the update target blocks of the current frame to the counter portion 68. Further, the changed region storage portion 67 supplies a determination result of blocks other than the update target blocks of the current frame to the counter portion 68. Based on the output of the change determination portion 66 and on the output of the changed region storage portion 67, the counter portion 68 counts the number of the blocks within a single image under surveillance in which there has been a change.

The threshold determination portion 69 is an alarm threshold determination unit that compares the counted value with an alarm threshold value and that outputs an alarm when the counted value is larger than the alarm threshold value. The threshold determination portion 69 compares the number of blocks counted by the counter portion 68 with a predetermined threshold value that is set in advance. When the counted number of blocks is larger than the threshold value, it is determined that an act of sabotage has been detected, and a detection signal is output. The detection signal can be, for example, an alarm.

Detailed Configuration of the Normalization Processing Portion 65

Figure 4:
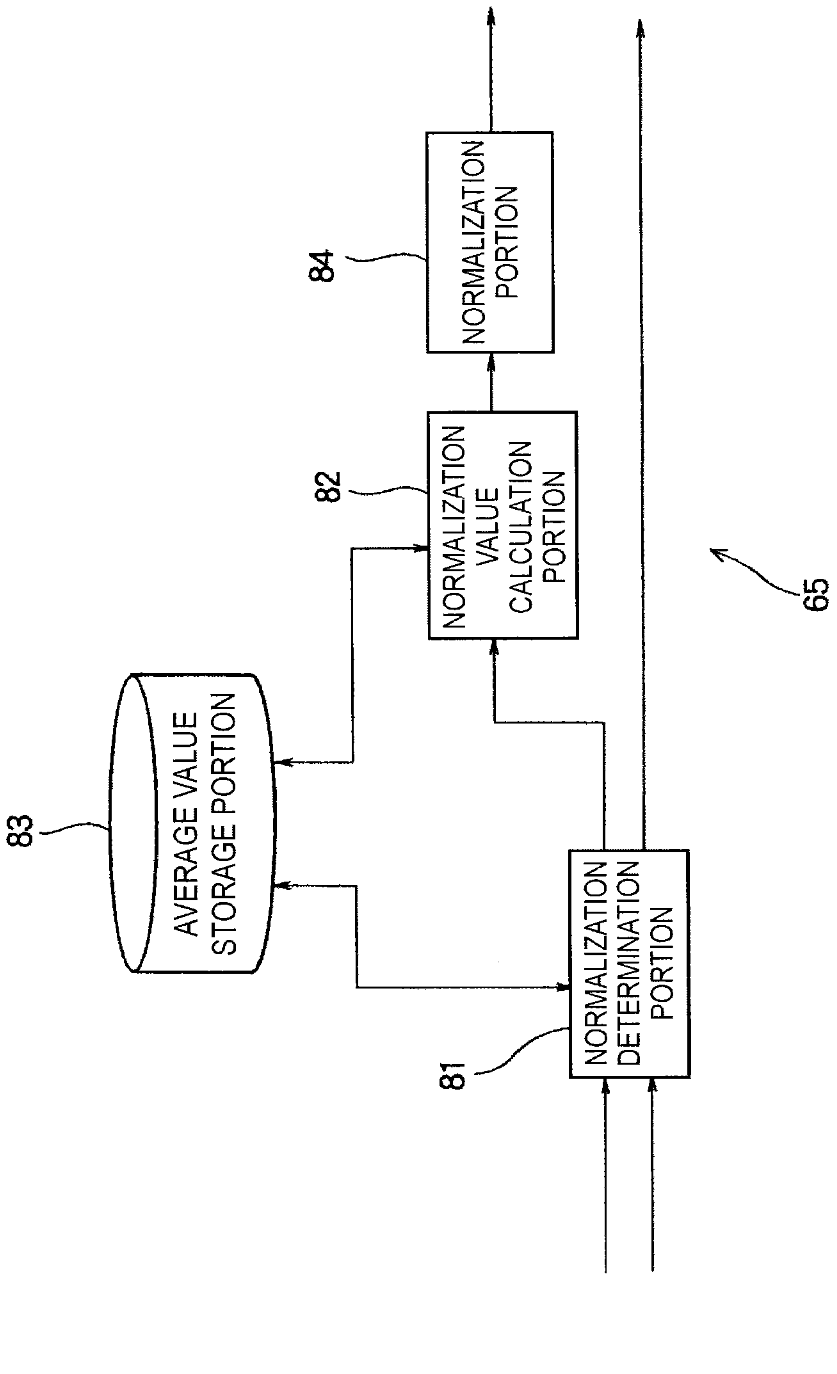
FIG. 4 is a block diagram showing a detailed configuration example of a normalization processing portion.

FIG. 4 is a block diagram showing a detailed configuration example of the normalization processing portion 65. The normalization processing portion 65 includes a normalization determination portion 81, a normalization value calculation portion 82, an average value storage portion 83 and a normalization portion 84.

The histogram of each of the update target blocks of the current frame is supplied to the normalization determination portion 81 from the histogram generation portion 64, and the past histogram corresponding to each of the blocks supplied from the histogram generation portion 64 is supplied to the normalization determination portion 81 from the histogram storage portion 62. Hereinafter, as appropriate, the histogram of each of the update target blocks of the current frame is referred to as a current histogram and the histogram of each of the corresponding blocks of the past frame is referred to as a past histogram.

The normalization determination portion 81 determines whether or not to perform normalization of the histogram of each of the update target block of the current frame. When the normalization determination portion 81 determines that normalization will not be performed (is not necessary), the current histogram and past histogram of each of the input update target blocks are supplied to the change determination portion 66 without change. When the normalization determination portion 81 determines that normalization will be performed (is necessary), the current histogram and the past histogram of each of the input update target blocks are supplied to the normalization value calculation portion 82.

The normalization value calculation portion 82 calculates, from the current histogram and the past histogram of each of the input update target blocks, a normalization value to be used in the normalization. The calculated normalization value is supplied to the normalization portion 84, along with the current histogram and the past histogram of each of the input update target blocks.

The average value storage portion 83 stores a direction of change and a rate of change of an average value of a histogram for each of the blocks other than the update target blocks, the average value of the histogram being calculated before the current frame. Further, a similar value that has been calculated by the normalization determination portion 81 and by the normalization value calculation portion 82 with respect to the current frame is supplied to and stored in (namely, it is updated in) the average value storage portion 83 in order to be used in processing from a next frame onwards. The values stored in the average value storage portion 83 (the direction of change and the rate of change of the average value of the histogram) will be explained in more detail later.

Based on the normalization value calculated by the normalization value calculation portion 82, the normalization portion 84 normalizes one of either the current histogram or the past histogram of each of the update target blocks. In this way, using the current histogram and the past histogram, it is possible to generate a histogram for which brightness of the blocks has been corrected. The normalization portion 84 outputs the current histogram and the past histogram after normalization to the change determination portion 66.

Note that, with the type of configuration shown in FIG. 4, it is possible to improve performance. Specifically, by providing the normalization determination portion 81 and determining whether or not to perform normalization as described above (and as will be described below), overall performance can be improved. However, a configuration is also possible in which the normalization determination portion 81 is not provided, calculation of the normalization value is performed by the normalization value calculation portion 82 with respect to all regions and normalization is performed by the normalization portion 84. When the configuration without the normalization determination portion 81 is adopted, the average value storage portion 83 is also omitted. Specifically, the normalization processing portion 65 can be configured by the normalization value calculation portion 82 and the normalization portion 84.

Detailed Configuration of the Defocus Detection Portion 42

Figure 5:
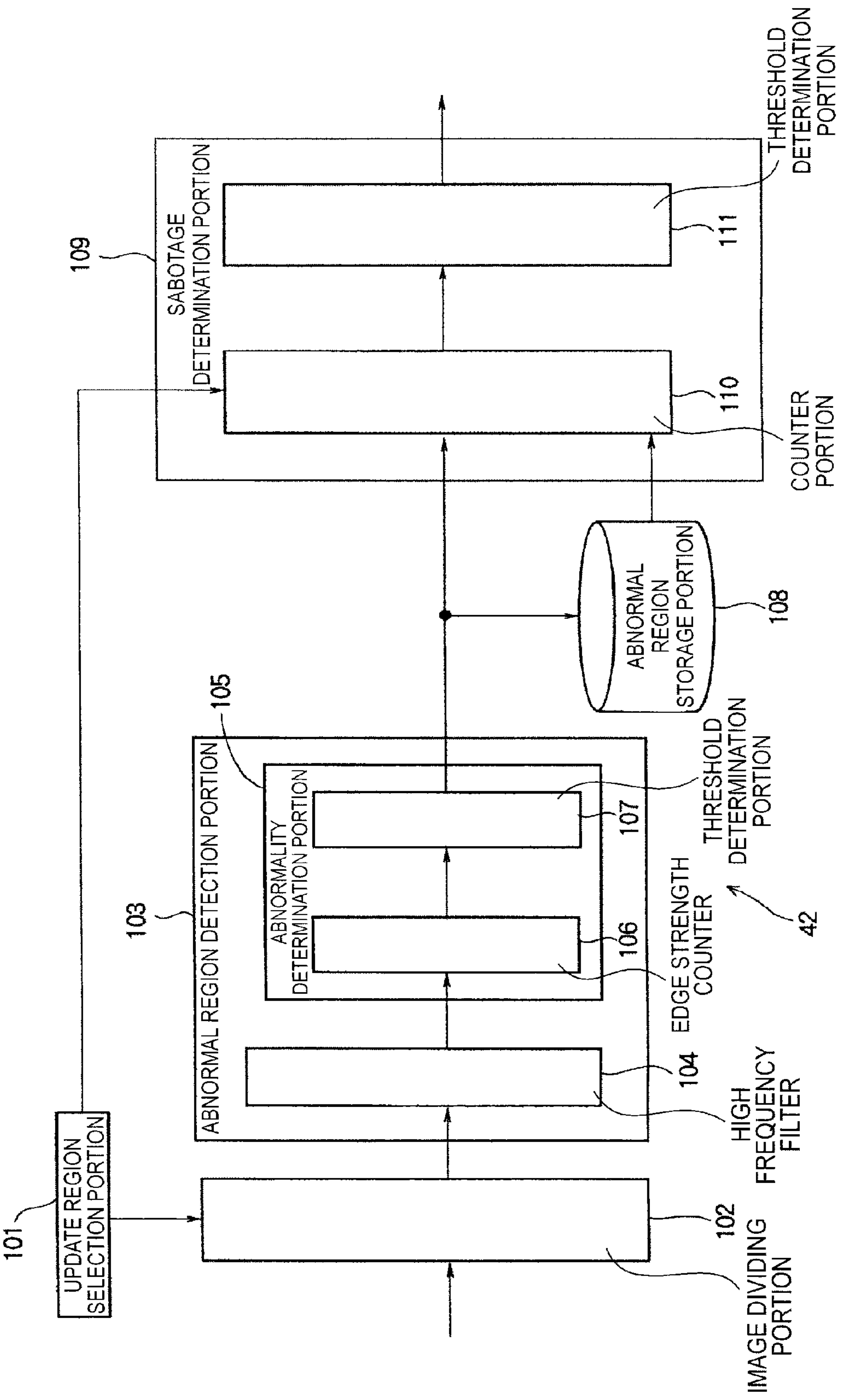
FIG. 5 is a diagram showing a configuration of a defocus detection portion.

FIG. 5 is a block diagram showing a detailed configuration example of the defocus detection portion 42. The defocus detection portion 42 includes an update region selection portion 101, an image dividing portion 102, an abnormal region detection portion 103, a high frequency filter 104, an abnormality determination portion 105, an edge strength counter 106, a threshold determination portion 107, an abnormal region storage portion 108, a sabotage determination portion 109, a counter portion 110 and a threshold determination portion 111.

The update region selection portion 101 functions as a specifying unit that sequentially specifies, each time image data of a new image is acquired, a number of blocks M from among a number of blocks N (N≥M>1) as blocks to be updated. From data supplied from the imaging signal processing portion 31, the update region selection portion 101 extracts a frame number of an image acquired by the acquisition portion 21 and decides a frame number to be updated. Further, the update region selection portion 101 decides a block to be updated in the frame to be updated.

The image dividing portion 102 is a dividing unit that divides the acquired image into the number of blocks N (N>1). Of the images of each frame based on the image data supplied from the imaging signal processing portion 31, the image dividing portion 102 divides the frame specified by the update region selection portion 101 into a plurality of blocks. Further, the image dividing portion 102 supplies, of the divided blocks, image data of the blocks specified by the update region selection portion 101 to the high frequency filter 104 of the abnormal region detection portion 103.

The high frequency filter 104 is a filtering unit that performs filtering by a high frequency filter on the acquired image data. The high frequency filter 104 executes filtering processing by a predetermined high frequency filter on the blocks supplied from the image dividing portion 102.

The abnormality determination portion 105 is an abnormality determining unit that determines an abnormality of the acquired image. The abnormality determination portion 105 includes the edge strength counter 106 and the threshold determination portion 107. The edge strength counter 106 functions as a calculation unit that counts a number of pixels whose edge strength is greater than a predetermined threshold value and calculates an edge strength average value etc.

The threshold determination portion 107 is an alarm threshold determination unit. The threshold determination portion 107 compares a number of pixels and an average value etc. with predetermined threshold values, and determines that an abnormality exists in an image of a block having larger than the threshold values. The threshold determination portion 107 outputs a determination result (the presence or absence of an abnormality) regarding an abnormality of the image of the block to the abnormal region storage portion 108 and to the counter portion 110.

The abnormal region storage portion 108 stores the result of the determination by the abnormality determination portion 105. Specifically, the presence or absence of an abnormality in the update target block of the current frame with respect to the past block is sequentially stored in the abnormal region storage portion 108 each time the image data of the new image is acquired.

The sabotage determination portion 109 includes the counter portion 110 and the threshold determination portion 111. The sabotage determination portion 109 determines whether or not there has been an act of sabotage against the surveillance camera. The counter portion 110 is a counting unit that counts a number of the blocks in which it is determined that there has been an abnormality. The abnormality determination portion 105 supplies the determination result (the presence or absence of an abnormality) of the update target block of the current frame to the counter portion 110. Further, the abnormal region storage portion 108 supplies a determination result of the blocks other than the update target block of the current frame to the counter portion 110. Based on the output of the abnormality determination portion 105 and on the output of the abnormal region storage portion 108, the counter portion 110 counts the number of blocks within a single image under surveillance in which there has been an abnormality.

The threshold determination portion 111 is an alarm threshold determination unit that compares the counted value with an alarm threshold value and that outputs an alarm when the counted value is larger than the alarm threshold value. The threshold determination portion 111 compares the number of blocks counted by the counter portion 110 with a predetermined threshold value that is set in advance. When the counted number of blocks is larger than the threshold value, it is determined that an act of sabotage has been detected, and a detection signal is output. The detection signal can be, for example, an alarm.

In this way, according to the present embodiment, as the global change detection portion 41 and the defocus detection portion 42 are provided, these detection portions can respectively detect the global change sabotage relating and the defocusing sabotage. Hereinafter, processing performed, respectively, by the global change detection portion 41 and by the defocus detection portion 42 will be explained. First, the explanation will be made with respect to the global change detection portion 41.

Detection by the Global Change Detection Portion 41

Principles (an overview) of the act of sabotage detection by the global change detection portion 41 will be explained. The global change detection portion 41 acquires, respectively, a past image PI and a current image NI, divides each of the past image PI and the current image NI into blocks of a predetermined size, and calculates a histogram of pixel values for each block. Then, a degree of similarity is calculated between a histogram of a block in a predetermined position of the past image PI and a histogram of a block in a corresponding position of the current image NI. Blocks with a low degree of similarity are detected as a changed region VI, and when a number of the changed regions VI is large, it is determined that there has been an act of sabotage. In this case, an alarm is output. Next, processing performed here by blocks that configure the global change detection portion 41 will be explained.

Processing of the Normalization Determination Portion 81

Processing by the normalization determination portion 81 will be explained with reference to FIG. 6. The normalization determination portion 81 is supplied with the current histogram and the past histogram of each of the update target blocks of the current frame. In the example shown in FIG. 6, the image is divided into 16 blocks, and 4 blocks shaded by oblique lines indicate the update target blocks of the current frame.

The normalization determination portion 81 calculates an average value of each of the current histogram and the past histogram for each of the update target blocks of the current frame, and determines whether a direction of change of the average values from the past to the current time is an increase, a decrease or no change. For example, if a difference (an absolute value) between the average values of the past and the current histograms is within a predetermined range TH, it can be determined that there is no change. If the difference is greater than the predetermined range TH, it can be determined that there is an increase or a decrease depending on the direction of change.

Further, the normalization determination portion 81 acquires, from the average value storage portion 83, a determination result (the direction of change) of a similar determination with respect to the blocks that are not the update target blocks of the current frame. Then, the normalization determination portion 81 determines, as a change of the whole screen, whether there has been an increase, a decrease or no change. For example, if the number of blocks in which there has been an increase (decrease) with respect to the number of blocks of the whole screen is equal to or larger than a predetermined ratio that has been set in advance, it can be determined that the change is that of an increase (decrease) for the whole screen.

Figure 6:
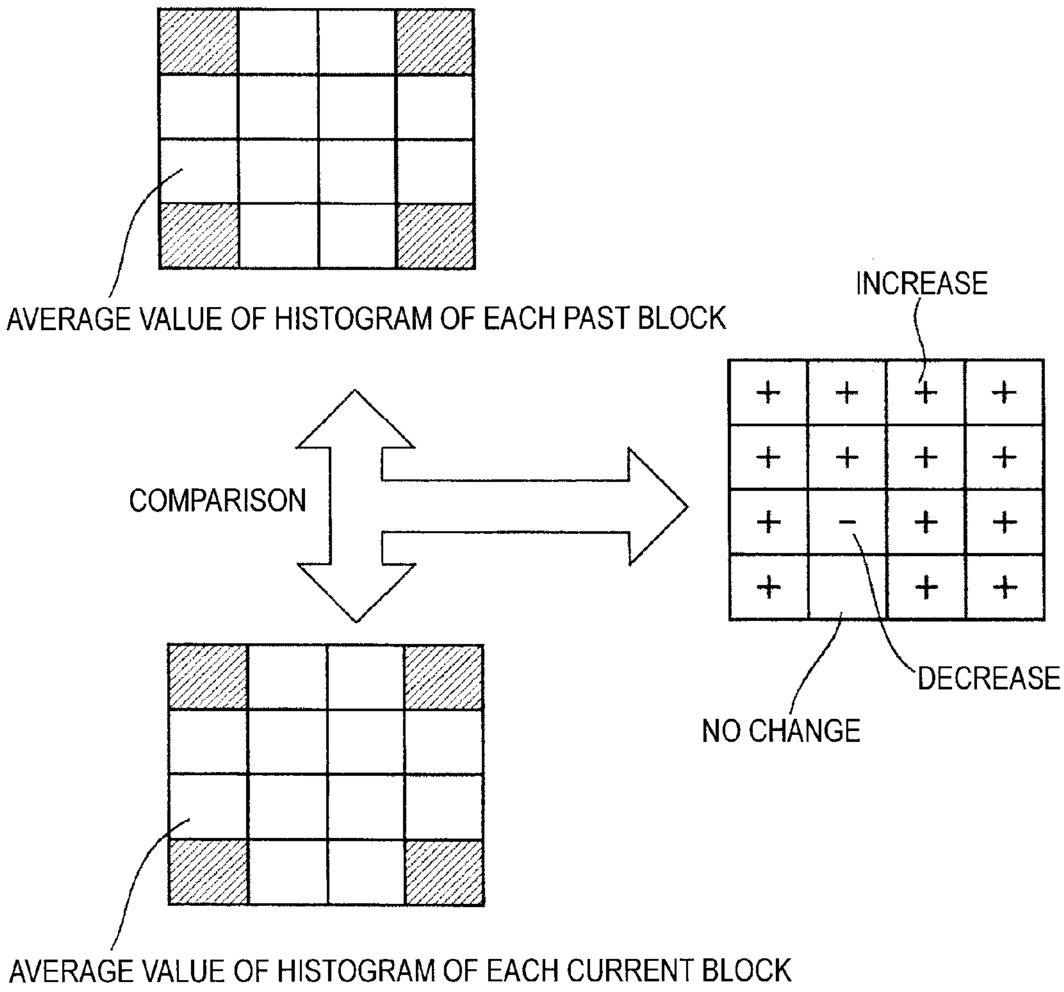
FIG. 6 is a diagram illustrating processing of a normalization determination portion.

In a diagram shown on the right in FIG. 6, blocks assigned with a plus (+) sign indicate blocks for which the direction of change is an increase, and blocks assigned with a minus (−) sign indicate blocks for which the direction of change is a decrease. Blocks that are not assigned with a sign indicate blocks for which there is no change. For the frame shown on the right side in FIG. 6, it is determined for the whole screen that this is a frame in which a change of increase has been seen.

For the whole screen, when the direction of change of the average value of the histogram is biased toward either an increase or a decrease by equal to or greater than a given constant, this means that the whole screen has become lighter or has become darker. In this case, it is conceivable that the luminance of the whole image has changed due to an AE function or lighting, or that the luminance of the whole screen has changed due to an act of sabotage, such as concealing the surveillance camera, and it is preferable to perform normalization. On the other hand, if there is no change in the average value of the histogram for the whole screen, or if no bias is seen in the increase or decrease of the average value, it is preferable for normalization not to be performed.

In this type of case, it is conceivable that there has been no change in the image, that there has been a change in a part of the screen caused by the entry of a moving body, or indeed that there has been an act of sabotage, such as changing the orientation of the surveillance camera, and if normalization is performed, there are many regions in which a shape of the histograms may coincidentally match. Thus, a situation is in fact conceivable in which the act of sabotage cannot be detected, and normalization is not performed, in order to inhibit this kind of situation.

As described above, when the direction of change of the average value of the histogram for the whole screen is biased, by equal to or greater than a given constant, toward either an increase or a decrease, the normalization determination portion 81 determines that it is necessary to perform normalization. On the other hand, when there is no change in the average value of the histogram for the whole screen, or when there is no bias in the average value toward either an increase or a decrease, the normalization determination portion 81 determines that normalization is not necessary.

Processing of the Normalization Value Calculation Portion 82

Processing of the normalization value calculation portion 82 will be explained with reference to FIG. 7. When the change of direction of the average value of the histogram for the whole screen is biased, by equal to or greater than a given constant, toward an increase or a decrease, the normalization value calculation portion 82 calculates a rate of change (hereinafter referred to as a change rate) that represents, for the whole screen, to what degree change has occurred.

First, the normalization value calculation portion 82, for each block, calculates the respective average values of the current histogram and the past histogram. For each of the update target blocks of the current frame, the normalization value calculation portion 82 calculates the average value from the supplied histogram. The average values of the current histogram and the past histogram of the blocks other than the update target blocks of the current frame are acquired from the average value storage portion 83, where they have already been calculated and stored.

Next, the normalization value calculation portion 82 decides an effective region from the whole screen. Here, when the normalization determination portion 81 has determined that the direction of change for the whole screen is an increase, each region of the blocks in which the direction of change is the increase is set as the effective region. Then, for each of the blocks set as the effective region, the normalization value calculation portion 82 divides the average value of the current histogram by the average value of the past histogram and sets a resulting value as the change rate. In this way, the change rate is calculated for each of the blocks set as the effective region.

Note that, when it is determined that the direction of change for the whole screen is an increase, each of the regions of the blocks in which the direction of change is the increase is set as the effective region. However, blocks for which a rate of increase is equal to or larger than a predetermined value, namely, blocks which have become extremely bright, are also removed from the effective region. The blocks for which there has been no change, the blocks for which the direction of change of the average value is a decrease, and the blocks which have become extremely bright are removed from the effective region because in this case there is a high probability that a moving body is present that has caused a change in brightness by the AE function.

Figure 7:
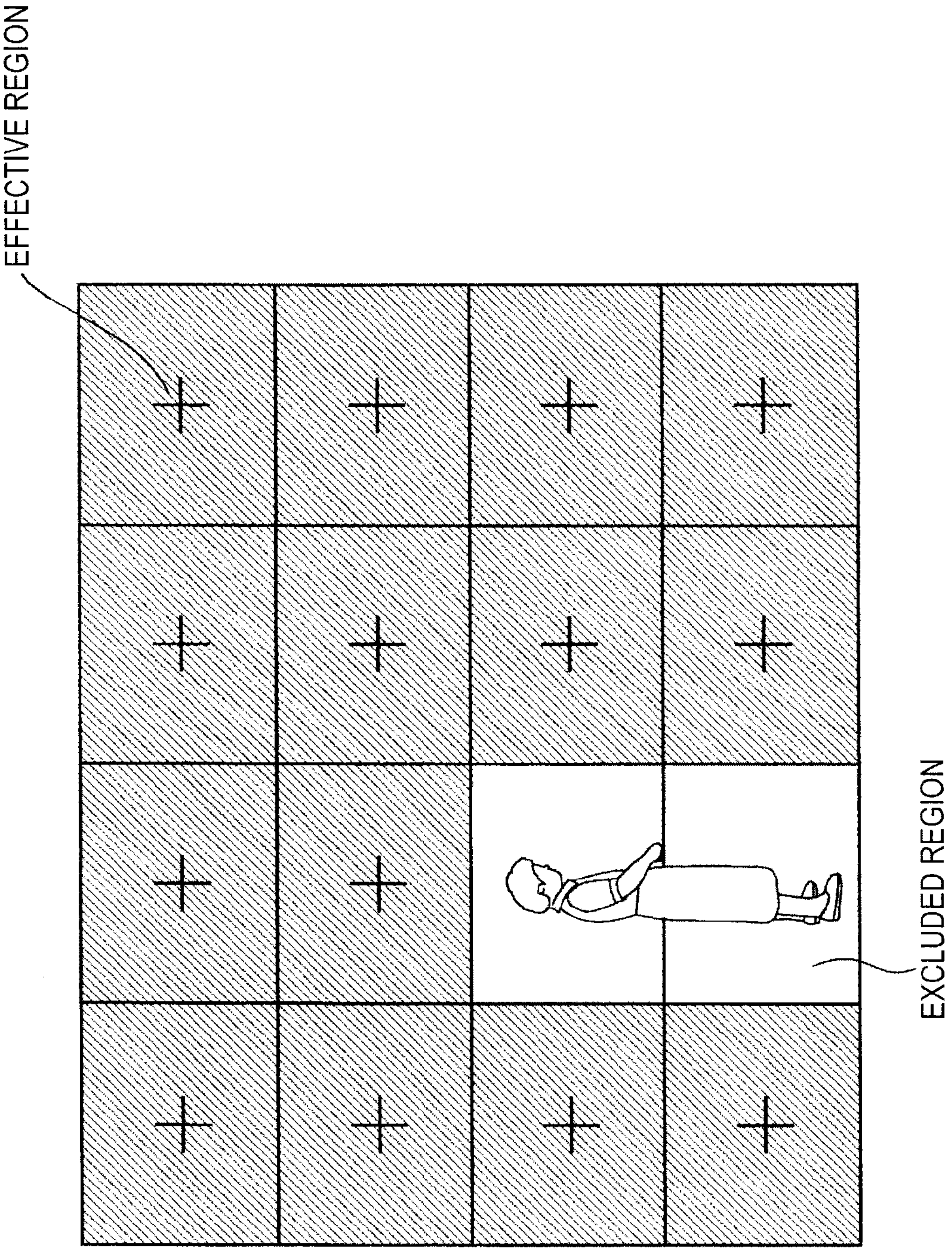
FIG. 7 is a diagram illustrating processing of a normalization value calculation portion.

In FIG. 7, the blocks shaded by oblique lines are blocks that are set as the effective region.

In contrast, when the normalization determination portion 81 determines that the direction of change for the whole screen is a decrease, each region of the blocks in which the direction of change is the decrease is set as the effective region. Then, for each of the blocks set as the effective region, the normalization value calculation portion 82 divides the average value of the past histogram by the average value of the current histogram and sets a resulting value as the change rate. In this way, also when the direction of change for the whole screen is a decrease, the change rate is calculated for each of the blocks set as the effective region.

Lastly, the normalization value calculation portion 82 calculates an average value of the calculated change rates for each of the blocks set as the effective region, and decides a resulting value as a normalization value.

As described above, by deciding the effective region and calculating the average value of the change rate of the effective region, a change rate of the whole screen that excludes an influence of a moving body region is calculated and is set as the normalization value. Thus, the subsequent normalization portion 84 can accurately perform normalization.

Processing of the Normalization Portion 84

Figure 8:
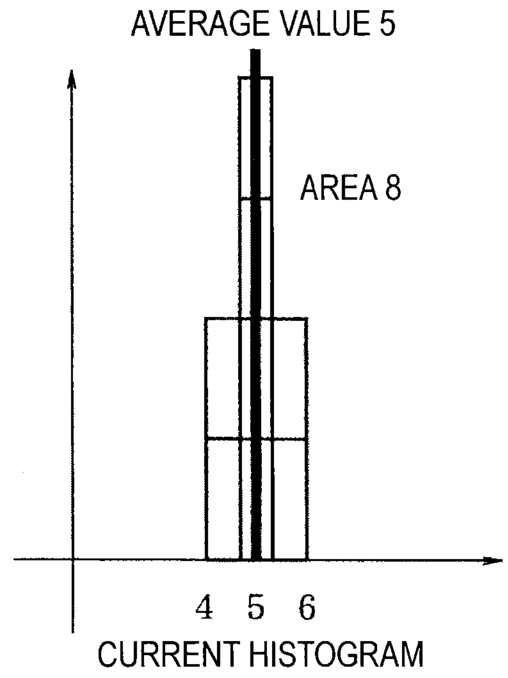
FIG. 8A is a diagram illustrating processing of a normalization portion.
FIG. 8B is a diagram illustrating processing of the normalization portion
Figure 8:
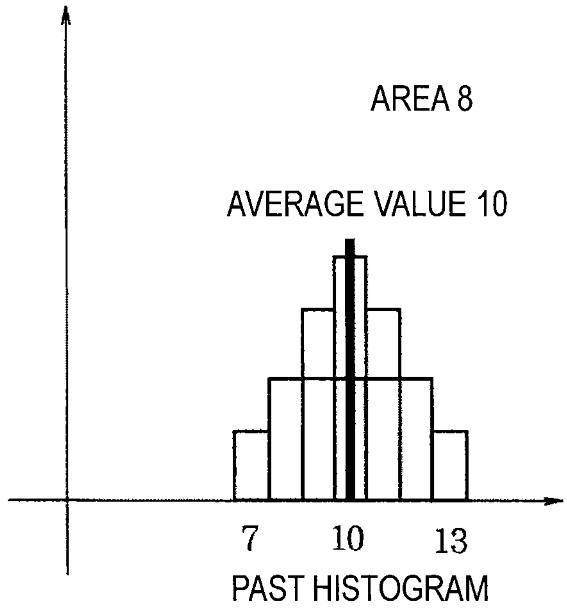

Processing of the normalization portion 84 will be explained with reference to FIG. 8 and FIG. 9. The normalization portion 84 uses the normalization value calculated by the normalization value calculation portion 82 to perform stretching between the current histogram and the past histogram of the update target block of the current frame. When the normalization determination portion 81 has determined that the direction of change for the whole screen is an increase, namely, that the whole screen has become brighter, the past histogram is stretched. On the other hand, when it is determined that the whole screen has become darker, the current histogram is stretched. In other words, of the past and the current histograms, the histogram on the darker side is stretched.

FIG. 8A and FIG. 8B show a current histogram and a past histogram for an update target block of a current frame. Horizontal axes of the histograms indicate luminance and vertical axes indicate a frequency (a number of pixels that have a luminance value of a predetermined range).

An average value of the current histogram shown in FIG. 8A is 5 and an area is 8. Meanwhile, an average value of the past histogram shown in FIG. 8B is 10 and an area is 8. Such a relationship between the current histogram and the past histogram can occur, for example, when lighting (sunlight) becomes darker on a same filmed subject. With respect to such current and past histograms, if the presence or absence of change is determined without performing normalization, in the change determination portion 66 that determines the degree of similarity using a degree of overlap between the histograms, it is determined that a change has occurred. However, if this is simply a change in the histogram due to lighting, the determination that there has been a change is a mistaken determination.

Figure 9:
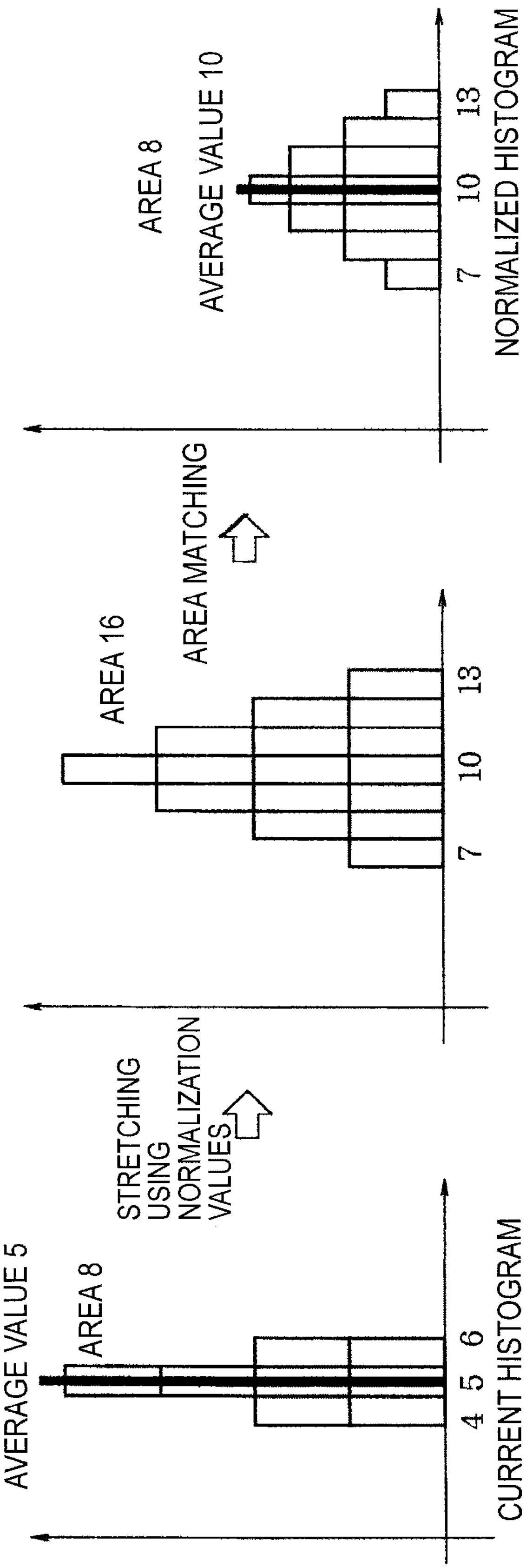
FIG. 9 is a diagram illustrating processing of the normalization portion.

Here, as shown in FIG. 9, the normalization portion 84 stretches the present histogram using the normalization value calculated by the normalization value calculation portion 82. More specifically, the normalization portion 84 stretches the current histogram in the horizontal axis direction (the luminance direction) by the normalization value.

In the example shown in FIG. 9, the normalization value is "2." The luminance values before stretching are only "4," "5," and "6" and thus if they are doubled, the only values are "8," "10," and "12," but frequencies of luminance values other than these are also calculated by interpolation from surrounding frequencies.

If the histogram is stretched, the area of the histogram increases and thus, next, the normalization portion 84 adjusts the frequencies of the histogram such that the area is the same before and after the normalization. In the example shown in FIG. 9, the area after the stretching of the current histogram is "16" and the area before the stretching is "8." Therefore, the frequency of each of the luminance values of the current histogram after the stretching is multiplied by "$8/16=1/2$." In this way, the area of the current histogram after normalization is the same "8" as before the normalization.

As described above, the current or the past histogram is normalized, depending on the direction of change for the whole screen. Then, the normalized histogram is output to the change determination portion 66.

Processing of the Change Determination Portion 66

Figure 10:
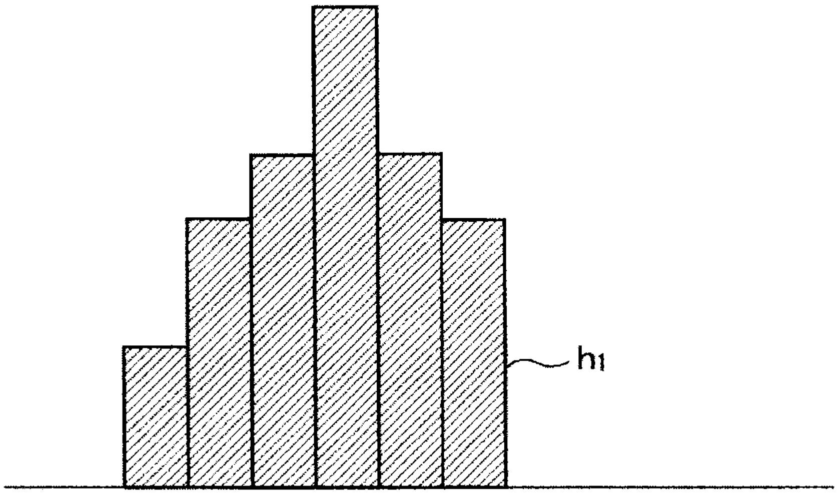
FIG. 10A is a block diagram showing a detailed configuration example of a change determination portion.
FIG. 10B sis a block diagram showing a detailed configuration example of the change determination portion.
Figure 10:
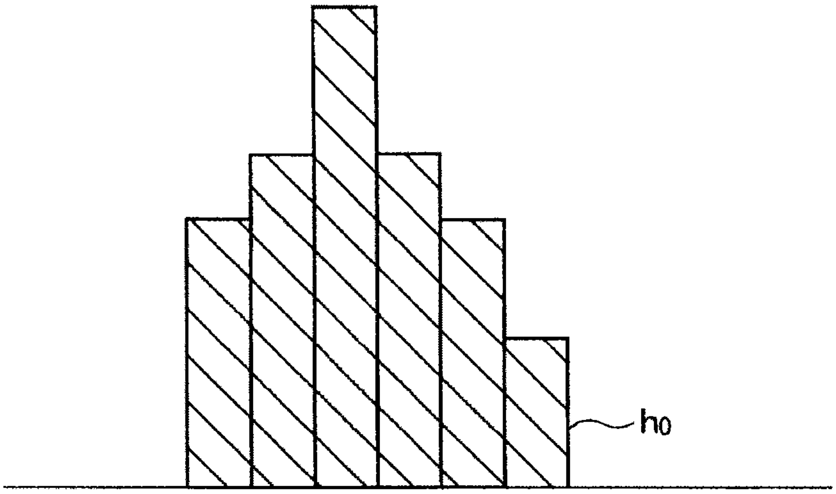
Figure 11:
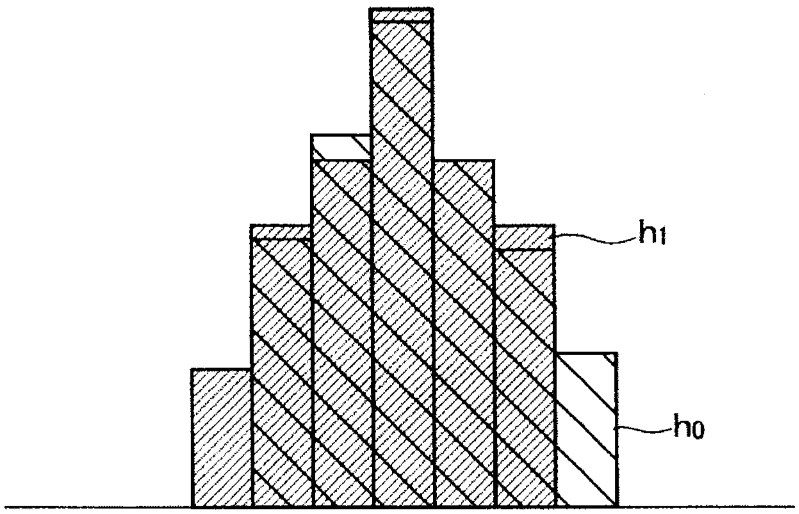
FIG. 11A is a diagram illustrating processing of the change determination portion.
FIG. 11B is a diagram illustrating the processing of the change determination portion.
Figure 11:
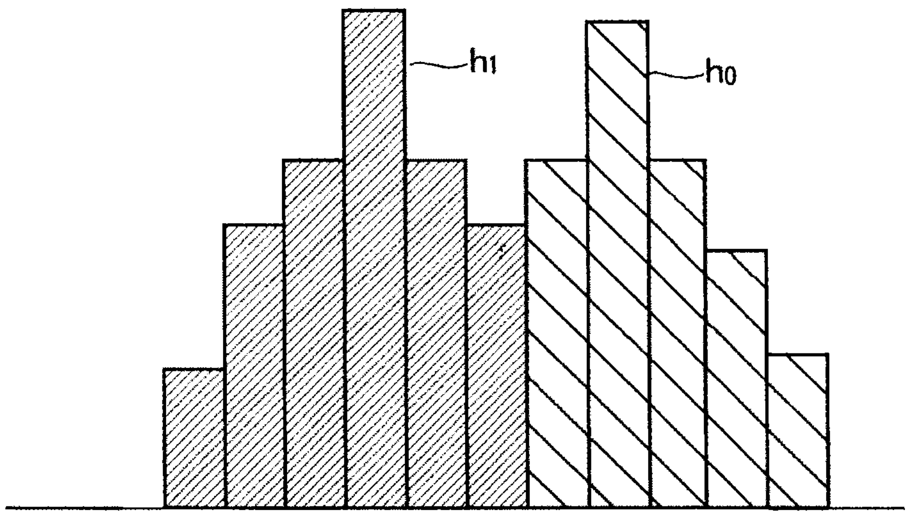

Determination performed by the change determination portion 66 to determine the presence or absence of change of the image of the block will be explained with reference to FIG. 10 and FIG. 11. FIG. 10 shows an example of a current histogram and a past histogram supplied to the degree of similarity calculation portion 71. Specifically, a histogram h1 shown in FIG. 10A is an example of the current histogram, and a histogram h0 shown in FIG. 10B is an example of the past histogram. Note that horizontal axes indicate a pixel value represented by a luminance value, and vertical axes indicate a number (frequency) of pixels that have a pixel value of a predetermined range.

With respect to the current histogram h1 and the past histogram h0 shown in FIG. 10, the degree of similarity calculation portion 71 calculates a degree of similarity using the following Formula (1) using intersection.

$$D=\Sigma\min(Ai,Bi) \quad (1)$$

Ai, Bi in Formula (1) respectively indicate one pixel value of the current histogram h1 and one pixel value of the past histogram h0. Therefore, according to Formula (1), for each pixel value, a sum is calculated for the smaller numerical value of the pixel (pixel value). This comparison processing is performed on the most recent past N (N>1) frame.

As shown in FIG. 11A, when almost all of the current histogram h1 and the past histogram h0 overlaps, a value D calculated by Formula (1) is large. In contrast, as shown in FIG. 11B, when there is little overlap between the current histogram h1 and the past histogram h0, the value D is smaller. In other words, the value D of the Formula (1) becomes larger the higher the degree of similarity, and becomes smaller the lower the degree of similarity.

Next, act of sabotage detection processing by the global change detection portion 41 of the image processing device 11 will be explained with reference to a flowchart shown in FIG. 12. First, at step S1, the acquisition portion 21 acquires a camera image. Specifically, the imaging portion captures an image of a predetermined surveillance target and acquires image data of the captured image.

Figure 13:
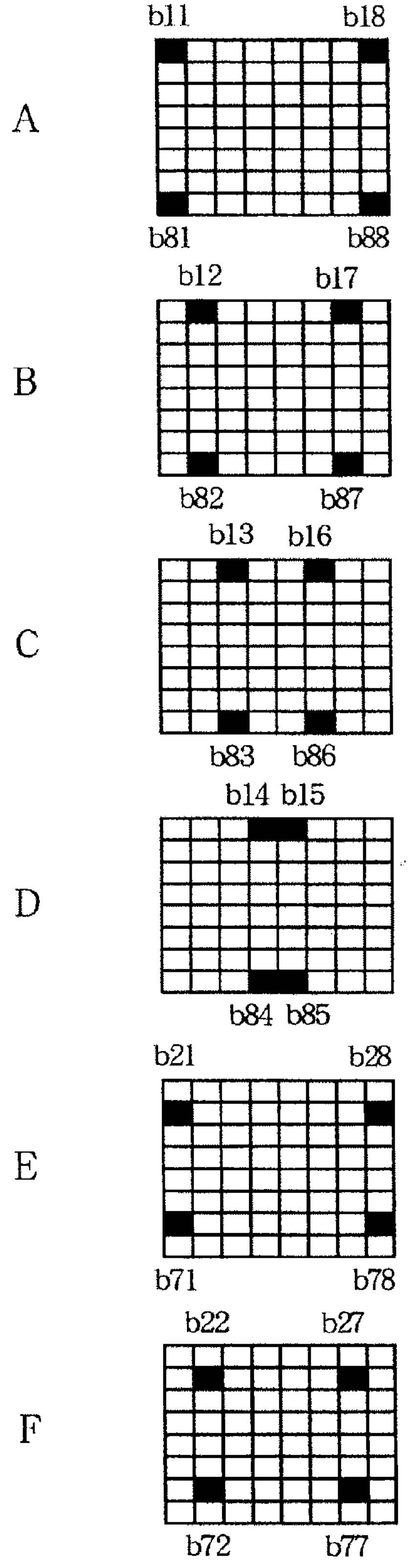
FIG. 13A is a diagram illustrating movement of blocks to be updated.
FIG. 13B is a diagram illustrating movement of blocks to be updated.
FIG. 13C is a diagram illustrating movement of blocks to be updated.
FIG. 13D is a diagram illustrating movement of blocks to be updated.
FIG. 13E is a diagram illustrating movement of blocks to be updated.
FIG. 13F is a diagram illustrating movement of blocks to be updated.

At step S2, the image dividing portion 63 divides the image into the number of blocks N. In the present embodiment, the image of each frame based on the image data is divided into 8×8 blocks. At step S3, the update region selection portion 61 selects the update region (the update target blocks). Specifically, of the 8×8 number of blocks, a predetermined number of blocks M (M≤N) are selected as the update target blocks. The selection of the update region will be explained with reference to FIG. 13.

FIG. 13A to FIG. 13F are diagrams illustrating movement of blocks to be updated. In the present embodiment, M=4 and the 8×8 number of blocks are divided into 4 groups, each formed of 4×4 blocks. Then, one block is selected from each of the groups, and a total of 4 blocks are selected as the update target blocks. More specifically, as shown in FIG. 13A, the update region selection portion 61 selects 4 blocks from among the 8×8 number of blocks of a first frame, as the blocks to be updated. Specifically, the update region selection portion 61 selects a block b11 that is positioned furthest to the left of a first row, a block b18 that is positioned furthest to the right of the first row, a block b81 that is positioned furthest to the left of an eighth row and a block b88 that is positioned furthest to the right of the eighth row.

Note that, in FIG. 13A to FIG. 13F, a block that is positioned in an i-th row from the top and that is positioned in a j-th column from the left is indicated as bij. This also applies to FIG. 15 and FIG. 16 that will be described later.

Next, in the update region selection step, as shown in FIG. 13B, the update region selection portion 61 selects 4 blocks from among the 8×8 number of blocks of a next frame, as the blocks to be updated. Specifically, the update region selection portion 61 selects a block b12 that is positioned one block to the right of the block b11, a block b17 that is positioned one block to the left of the block b18, a block b82 that is positioned one block to the right of the block b81 in the eighth row and a block b87 that is positioned one block to the left of the block b88.

Next, in the update region selection step, as shown in FIG. 13C, the update region selection portion 61 selects 4 blocks from among the 8×8 number of blocks of a next frame, as the blocks to be updated. Specifically, the update region selection portion 61 selects a block b13 that is positioned one block to the right of the block b12 in the first row, a block b16 that is positioned one block to the left of the block b17, a block b83 that is positioned one block to the right of the block b82 in the eighth row and a block b86 that is positioned one block to the left of the block b87.

Next, in the update region selection step, as shown in FIG. 13D, the update region selection portion 61 selects 4 blocks from among the 8×8 number of blocks of a next frame, as the blocks to be updated. Specifically, the update region selection portion 61 selects a block b14 that is positioned one block to the right of the block b13 in the first row, a block b15 that is positioned one block to the left of the block b16, a block b84 that is positioned one block to the right of the block b83 in the eighth row and a block b85 that is positioned one block to the left of the block b86.

As described above, when movement has ended in the block selection for the top and bottom rows, in the next step in the update region selection, a second row and a seventh row are selected. Then, as shown in FIG. 13E, the update region selection portion 61 selects 4 blocks from among the 8×8 number of blocks of a next frame, as the blocks to be updated. Specifically, the update region selection portion 61 selects a block b21 that is positioned furthest to the left of the second row, a block b28 that is positioned furthest to the right of the second row, a block b71 that is positioned furthest to the left of the seventh row and a block b78 that is positioned furthest to the right of the seventh row.

Next in the update region selection step, as shown in FIG. 13F, the update region selection portion 61 selects 4 blocks from among the 8×8 number of blocks of a next frame, as the blocks to be updated. Specifically, the update region selection portion 61 selects a block b22 that is positioned one block to the right of the block b21 in the second row, a block b27 that is positioned one block to the left of the block b28, a block b72 that is positioned one block to the right of the block b71 in the seventh row and a block b77 that is positioned one block to the left of the block b78.

Hereinafter, by a similar procedure, as the update target blocks, 4 blocks are sequentially selected for one frame. Specifically, in a region of an upper half of a left side half, the blocks are selected from the left toward the right within each row and the rows are selected in order from the top in the downward direction. In a region of an upper half of a right side half, the blocks are selected from the right toward the left within each row and the rows are selected in order from the top in the downward direction. In a region of a lower half of the left side half, the blocks are selected from the left toward the right within each row and the rows are selected in order from the bottom in the upward direction. In a region of a lower half of the right side half, the blocks are selected from the left toward the right within each row and the rows are selected in order from the bottom in the upward direction.

Note that the region movement order shown in FIG. 13A to FIG. 13F is an example and the present technology is not limited to this example. In the above explanation, the image is divided into 4 groups formed of 4×4 blocks, and the blocks to be updated are sequentially selected within each group as described above. However, the present technology is not limited to the selection as described above. For example, as shown in FIG. 13A, as start positions of the blocks to be updated, the block b11 on the upper left, the block b18 on the upper right, the block b81 on the lower left and the block b88 of the lower right are respectively selected. However, for example, a block on the upper right of each of the groups may be set as the start position of the blocks to be updated.

The blocks to be updated within each of the groups need not necessarily be selected based on the same type of principles. For example, the blocks to be updated may be selected based on different principles for each group, such as a group in which the blocks to be updated are selected in the horizontal direction, a group in which the blocks to be updated are selected in the vertical direction, and a group in which the blocks to be updated are selected in a zig-zag pattern etc.

A further principle is random selection. When the blocks to be updated are randomly selected, a random position may be selected in each of the groups or a randomly selected position may be applied to all the groups. In the former case, for example, positions of the blocks to be updated selected within each of the groups are different, such as the upper right, the lower left, a block second from the upper right in the horizontal direction, and a center position and so on. In the latter case, for example, if a randomly set position is the upper right, the block on the upper right of each of the groups is the position of the block to be updated.

Further, the global change detection portion 41 and the defocus detection portion 42 respectively select the blocks to be updated based on the selection of the blocks to be updated as in the example shown in FIG. 13A to FIG. 13F, and determine whether or not there has been a change (abnormality) within the blocks to be updated. When there is some kind of sabotage within a single image captured by the surveillance camera, if there is a region (block) in which a change (abnormality) is easily detected, that region may be selected more often than other regions. In other words, all the blocks within each of the groups may be selected a same number of times within a same time period, or may be selected a different number of times.

Figure 12:
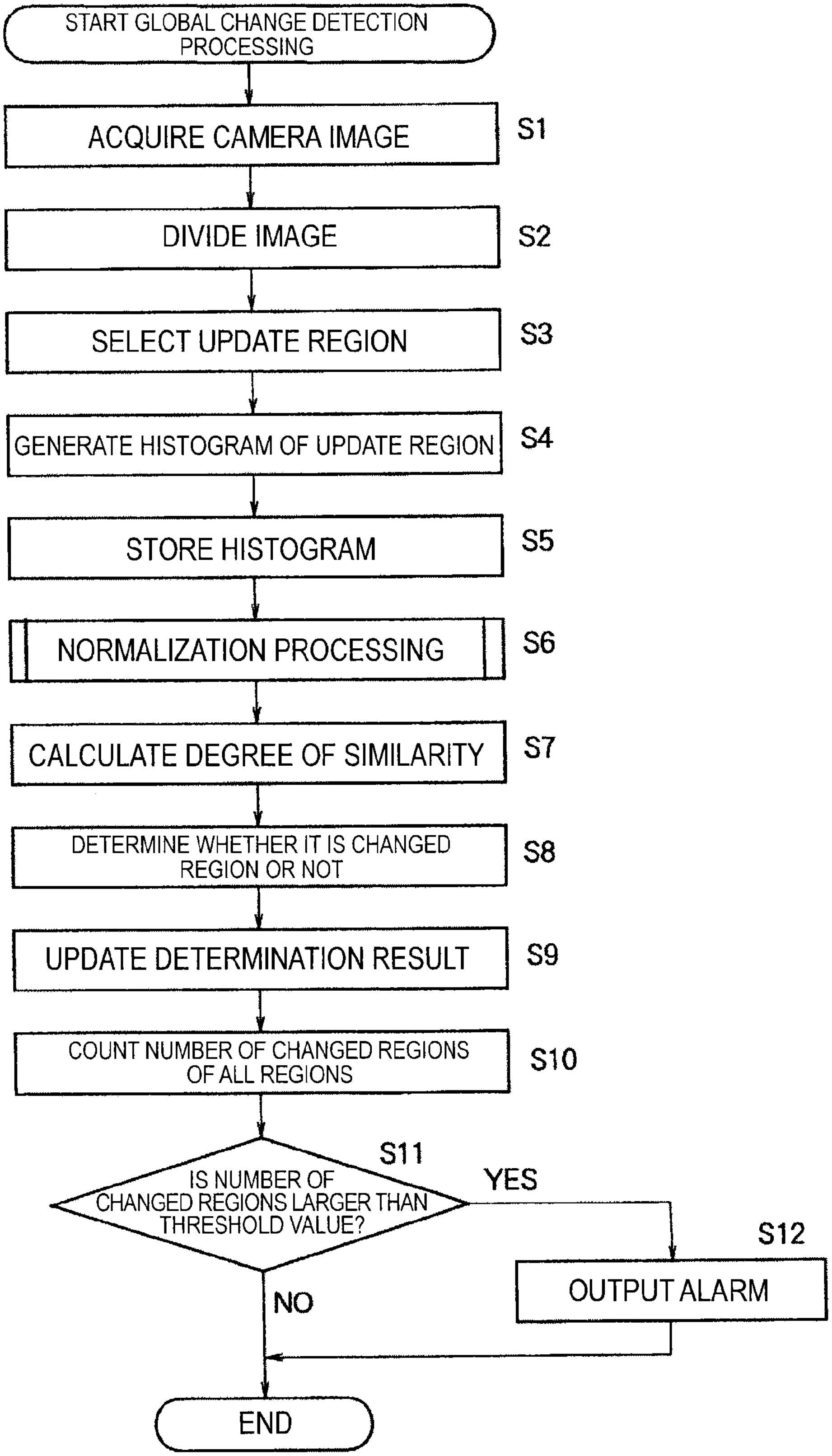
FIG. 12 is a flowchart illustrating processing of the global change detection portion.

The explanation will now return to the flowchart shown in FIG. 12. At step S4, the histogram generation portion 64 generates the histogram of the update region. At step S5, the histogram storage portion 62 stores the histogram generated at step S4. The histogram storage portion 62 stores the past data as the histogram and thus, for example, a storage capacity is smaller in comparison to a case in which the past data is stored as image data, such as pixel values. Costs can therefore be lowered.

At step S6, based on the histogram of the update target blocks of the current frame supplied from the histogram generation portion 64, the normalization processing portion 65 determines whether or not normalization is necessary, and performs the normalization processing as necessary.

At step S7, the degree of similarity calculation portion 71 calculates, for each of the update target blocks of the current frame, the degree of similarity between the current histogram and the corresponding past histogram. It should be noted that, when it is determined at step S6 that normalization is performed, the degree of similarity is calculated using the histogram after normalization.

At step S8, the threshold determination portion 72 determines whether or not each of the update target blocks of the current frame is the changed region. Specifically, a degree of similarity D calculated at step S7 is compared to a predetermined threshold value Thd that is set in advance. When the degree of similarity D is smaller than the threshold value Thd, it is determined that the block is the region in which a change has occurred. Even if, among a number of most recent N frames, there is one frame for which the degree of similarity D is smaller than the threshold value Thd, it is determined that there has been a change in the region.

At step S9, the changed region storage portion 67 updates the determination result for each of the update target blocks of the current frame. Specifically, the changed region storage portion 67 stores the determination result of one frame for each block (namely, a number of determination results equals the number of blocks), and updates the old determination results using the determination result obtained at step S8.

At step S10, the counter portion 68 counts the number of changed regions of all the regions. Specifically, based on the determination result (the presence or absence of change) of the update target blocks of the current frame from the change determination portion 66 and on the determination result of the blocks other than the update target blocks of the current frame from the changed region storage portion 67, the counter portion 68 counts the number of blocks that are determined to be the changed region from among the total of 64 blocks that form the frame of the image of the surveillance target.

At step S11, the threshold determination portion 69 determines whether or not the counted number of changed regions is larger than a threshold value. More specifically, the number of blocks determined to be the changed region that is counted at step S10 is compared with a predetermined threshold value Thc that is set in advance.

When it is determined at step S11 that the counted number of changed regions is larger than the threshold value, the processing advances to step S12, and the threshold determination portion 69 outputs a signal, such as an alarm or the like, that indicates that there has been an act of sabotage. On the other hand, when it is determined at step S11 that the counted number of changed regions is equal to or smaller than the threshold value, and after the processing at step S12, the act of sabotage detection processing ends.

The above-described processing is performed for each frame.

Details of Normalization Processing

Figure 14:
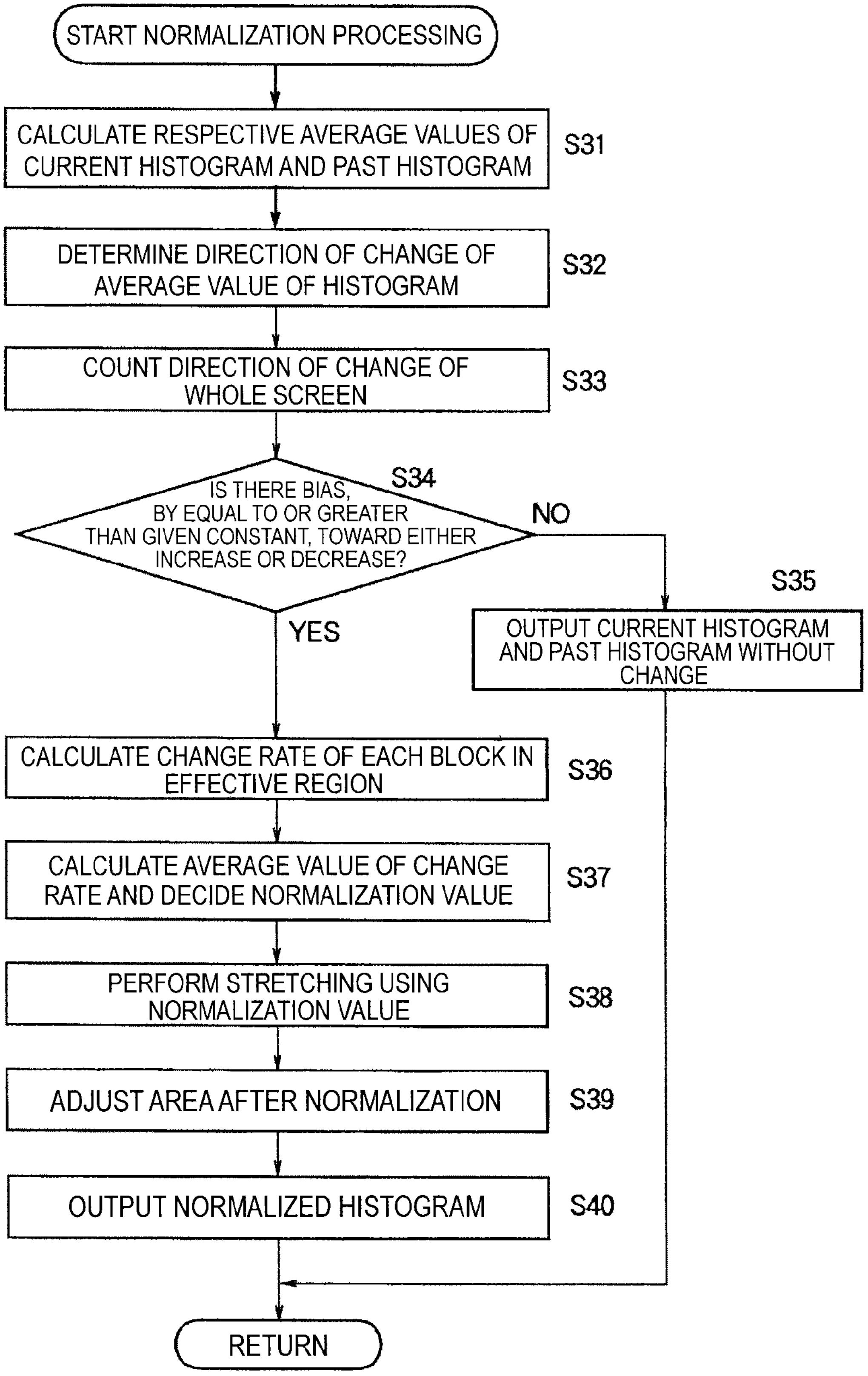
FIG. 14 is a flowchart illustrating normalization processing in detail.

FIG. 14 is a detailed flowchart of the normalization processing performed at step S6 shown in FIG. 12. In this processing, first, at step S31, the normalization determination portion 81 calculates, for each of the update target blocks, respective average values of the current histogram and the past histogram.

At step S32, the normalization determination portion 81 determines, for each of the update target blocks, the direction of change of the average values of the histograms. More specifically, the normalization determination portion 81 determines, for each of the update target blocks, whether the direction of change of the average values from the past histogram to the current histogram is an increase, a decrease or no change.

At step S33, the normalization determination portion 81 counts the direction of change for the whole screen. Specifically, the normalization determination portion 81 acquires, from the average value storage portion 83, the determination result when the blocks that are not the update targets are similarly determined, along with the determination result of each of the update target blocks. The normalization determination portion 81 then respectively counts, for the whole screen, the number of blocks in which there is an increase, the number of blocks in which there is a decrease and the number of blocks in which there is no change.

At step S34, the normalization determination portion 81 determines, for the whole screen, whether there is a bias toward either an increase or a decrease by equal to or greater than a given constant. When it is determined at step S34 that there is no bias toward either an increase or a decrease by equal to or greater than the given constant, the processing advances to step S35, and the normalization determination portion 81 outputs the current histogram and the past histogram of each of the update target blocks to the change determination portion 66 without change.

On the other hand, when it is determined at step S34 that there is a bias toward either an increase or a decrease by equal to or greater than the given constant, the processing advances to step S36 and the normalization determination portion 81 supplies the current histogram and the past histogram of each of the update target blocks to the normalization value calculation portion 82. Then, the normalization value calculation portion 82 calculates the change rate of each of the blocks of the effective region, excluding the abnormal region from the whole screen.

More specifically, average values of the current histogram and the past histogram are respectively calculated for each of the update target blocks. Further, the average values for the current histogram and the past histogram of the blocks other than the update target blocks are respectively acquired from the average value storage portion 83. Then, the effective region is decided corresponding to the direction of change of the whole screen, and the change rate of each of the blocks of the effective region is calculated by dividing either the average value of the past histogram by the average value of the current histogram, or vice versa, for each of the blocks set as the effective region.

At step S37, the normalization value calculation portion 82 calculates the average value of the change rate calculated for each of the blocks set as the effective region, and decides the result as the normalization value. At step S38, the normalization portion 84 uses the normalization value calculated at step S37 to perform stretching of either the current histogram or the past histogram.

At step S39, the normalization portion 84 adjusts the stretched histogram such that the area is the same before and after normalization. More specifically, the normalization portion 84 performs adjustment such that the area is the same before and after normalization by multiplying the frequency of each luminance value of the stretched histogram by an inverse number of an area magnification before and after stretching.

At step S40, the normalization portion 84 outputs the normalized histogram to the change determination portion 66. Specifically, the normalization portion 84 outputs to the change determination portion 66 the normalized current or past histogram and also the remaining non-normalized histogram.

After the processing at step S40, or after the processing at step S35, the normalization processing ends and the processing returns to the act of sabotage detection processing shown in FIG. 12.

Shape of Blocks

In the above-described embodiment shown in FIG. 13A to FIG. 13F, the blocks have a horizontally long shape, and movement is caused in the longitudinal direction of each of the blocks, namely in the horizontal direction. However, the application of the present technology is not limited to this shape. For example, the shape of the blocks can have a shape that is longer in a direction perpendicular to the movement direction. In other words, the block can be moved in a direction perpendicular to the longitudinal direction of the block.

Figure 15:
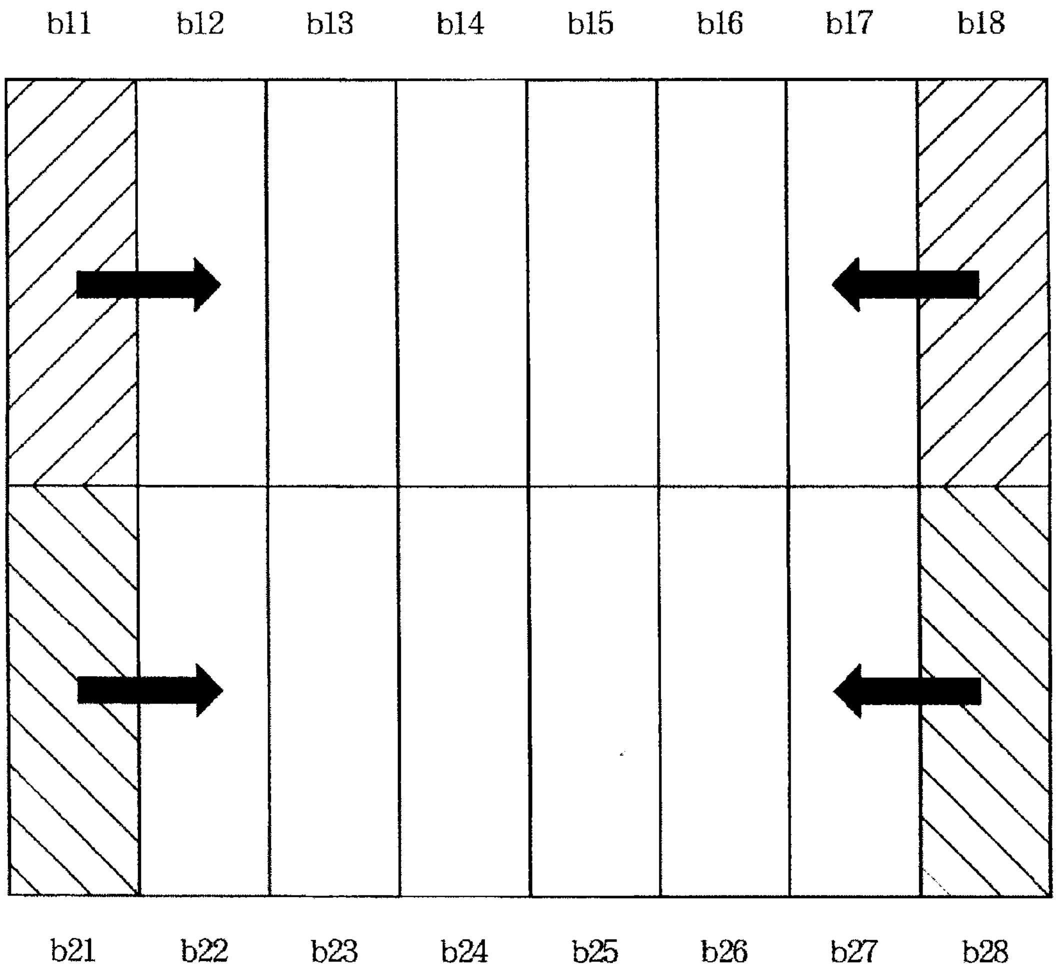
FIG. 15 is a diagram showing shapes of blocks.

FIG. 15 is a diagram showing shapes of blocks. In FIG. 15, the screen is divided into an upper half and a lower half, and each of the halves is divided into 8 blocks, from b11 to b18 and from b21 to b28. As a result, each of the blocks has a vertically long shape. Further, the movement direction of the blocks at the time of update is a direction perpendicular to the longitudinal direction, namely, the horizontal direction. For example, if the imaging portion can only perform movement in the horizontal direction, and the act of sabotage is limited to the horizontal direction, it is sufficient if the movement in the horizontal direction can be detected. Here, as shown in FIG. 15, the blocks can have a shape in which the vertical sides are longer than the horizontal sides with respect to the direction of change.

Figure 16:
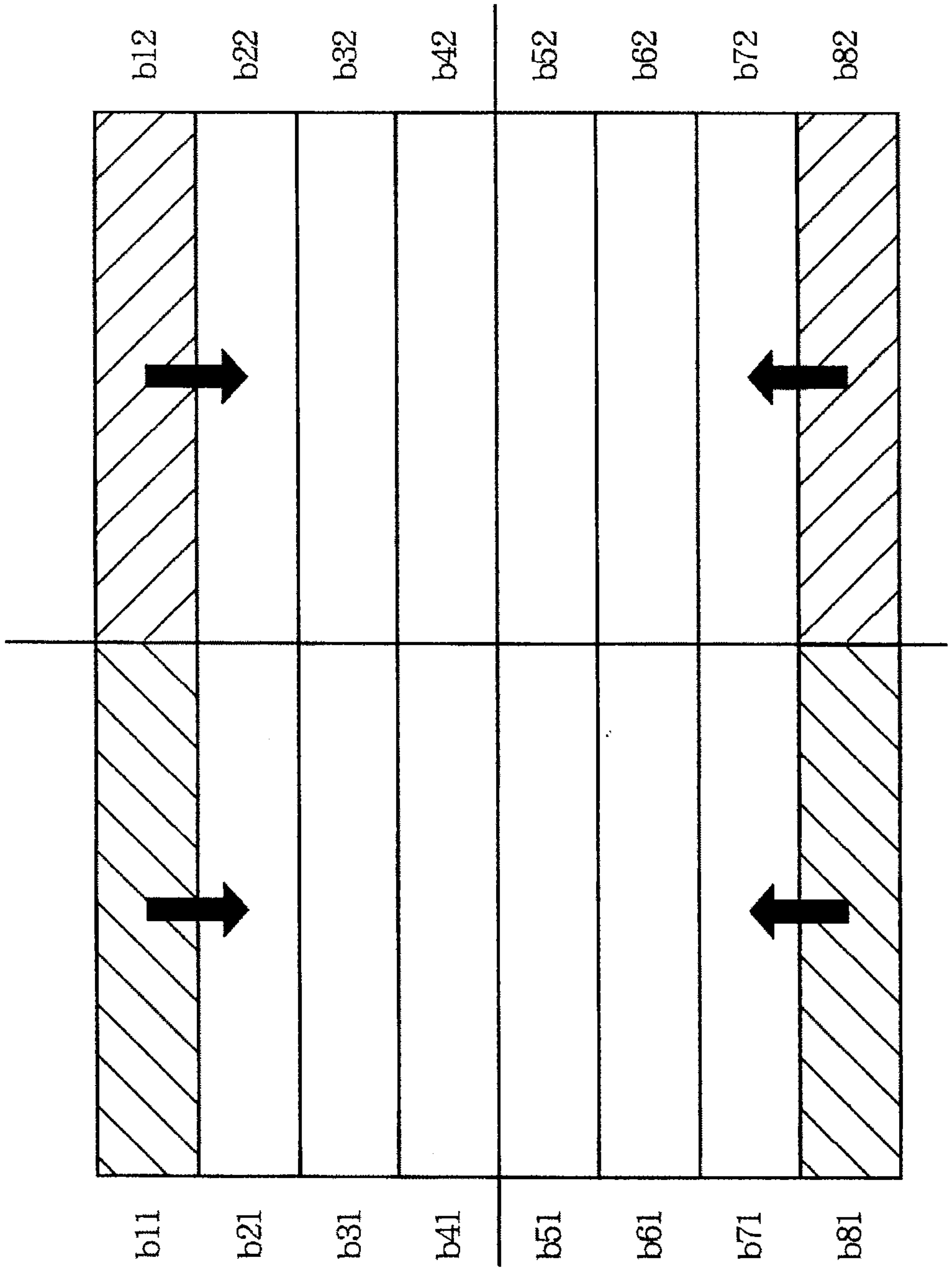
FIG. 16 is a diagram showing shapes of blocks.

FIG. 16 is a diagram showing shapes of blocks. In FIG. 16, the screen is divided into a left half and a right half, and each of the halves are divided into 8 blocks b11 to b81 and b12 to b82. As a result, each of the blocks has a horizontally long shape. Further, the movement direction of the blocks at the time of update is a direction perpendicular to the longitudinal direction, namely, the vertical direction. For example, if the imaging portion can only perform movement in the vertical direction, and the act of sabotage is limited to the vertical direction, it is sufficient if the movement in the vertical direction can be detected. Here, as shown in FIG. 16, the blocks can have a shape in which the horizontal sides are longer than the vertical sides with respect to the direction of change.

As described above, in the normalization processing, it is determined whether or not to perform normalization, and normalization of the histogram is performed as necessary. Specifically, when there is a bias in the direction of change of the whole screen toward either an increase or a decrease by equal to or greater than the given constant, the histogram is normalized. In this way, mistaken detection of an act of sabotage, which is caused by the AE function or a change in lighting etc., can be reduced. In addition, it is possible to reduce missed detection of an act of sabotage that arises when all the histograms are normalized uniformly. Furthermore, when normalizing the histogram, the change rate that excludes the regions having a different direction of change to the direction of the change of the whole screen is calculated as the normalization value, and thus, highly accurate normalization can be performed.

In this way, the global change detection portion 41 can accurately detect sabotage relating to a global change, such as changing the orientation of the surveillance camera or covering the surveillance camera with a cloth and the like. Next, processing by the defocus detection portion 42 will be explained.

Processing of the Defocus Detection Portion 42

Next, act of sabotage detection processing by the defocus detection portion 42 of the image processing device 11 will be explained with reference to a flowchart shown in FIG. 17. First, at step S51, the acquisition portion 21 acquires a camera image. Specifically, the imaging portion captures an image of the predetermined surveillance target and acquires image data of the captured image.

At step S52, the image dividing portion 102 divides the image into the number of blocks N. In the present embodiment, the image of each frame based on the image data is divided into 8×8 blocks. At step S53, the update region selection portion 101 selects the update region (the update target blocks). Specifically, of the 8×8 number of blocks, the predetermined number of blocks M (M≤N) is selected as the update target blocks. The selection of the update region can be performed in the same manner as the case explained with reference to FIG. 13, and an explanation is thus omitted here.

The processing from step S51 to step S53 is performed in a similar manner to the processing from step S1 to step S3 of the flowchart shown in FIG. 12. In other words, the update region selection portion 101 and the image dividing portion 102 of the defocus detection portion 42 can perform the same processing as that of the update region selection portion 61 and the image dividing portion 63 of the global change detection portion 41 shown in FIG. 3.

Thus, it is also possible for the update region selection portion 101 and the image dividing portion 102 of the defocus detection portion 42 to have a shared structure with the update region selection portion 61 and the image dividing portion 63 of the global change detection portion 41. For example, the update region selection portion 101 and the image dividing portion 102 of the defocus detection portion 42 shown in FIG. 5 can be removed from the defocus detection portion 42, setting of the update region can be received from the update region selection portion 61 of the global change detection portion 41, and supply of image groups of the image region divided up by the image dividing portion 63 can be received.

Of course, when the global change detection portion 41 and the defocus detection portion 42 each perform processing of different regions, or perform processing on regions of different sizes, the global change detection portion 41 and the defocus detection portion 42 can have the respective configurations shown in FIG. 3 and FIG. 5. In addition, the number of regions on which processing is performed for each frame may be different for the global change detection portion 41 and the defocus detection portion 42, respectively. When the global change detection portion 41 and the defocus detection portion 42 perform processing on a different number of regions, the global change detection portion 41 and the defocus detection portion 42 have the respective configurations as shown in FIG. 3 and FIG. 5.

For example, the global change detection portion 41 divides 1 frame into 4 groups and, from each of the groups, sets 1 region (1 block) as a processing target. In this case, a total of 4 regions are processed as the processing target (by the processing explained with reference to FIG. 13). Similarly to the global change detection portion 41, the defocus detection portion 42 divides 1 frame into 4 groups and, from each of the groups, sets 1 region (1 block) as a processing target. However, the global change detection portion 41 may perform processing on all the blocks as sequential processing targets.

At step S54, the high frequency filter 104 filters the update region using a predetermined filter. By performing the filtering processing, edges within the update region are extracted. At step S55, the edge strength counter 106 counts the strength of the edges extracted from the region that is the target of processing. Then, using the counted value, at step S56, the threshold determination portion 107 determines, for each of the update target blocks of the current frame, whether the block is the abnormal region or not. An explanation will be added of processing performed by the high frequency filter 104 and by the abnormality determination portion 105 (the edge strength counter 106 and the threshold determination portion 107).

The high frequency filter 104 extracts a high frequency component included in the input image within a predetermined region. For example, if a transfer function H of the high frequency filter 104 is expressed as a Z transform, it is expressed by Formula (2) below. Note that, in order to simplify the notation, Formula (2) is expressed as a one-dimensional formula, but as the input image is two-dimensional, in actuality, Formula (2) is expanded to a two-dimensional formula and used.

$$H(Z) = \frac{1}{2}(-1 + 2Z^{-1} - Z^{-2}) \tag{2}$$

It should be noted that the high frequency filter 104 may be configured such that it extracts the high frequency component using transformation processing such as wavelet transformation or the like. The high frequency component of the input image that is extracted by the high frequency filter 104 represents the edge strength of the input image (the image within the region specified as the target of processing). This type of edge strength is input into the edge strength counter 106. In the edge strength counter 106, frequency component values of the high frequency component that has passed through the high frequency filter 104 are calculated within the region.

The edge strength counter 106 counts a number of pixels for which the calculated frequency component value exceeds a predetermined threshold value (hereinafter referred to as a high frequency threshold value). Further, an accumulated value is calculated by summing the high frequency component values of each of the pixels within the region. More specifically, the edge strength counter 106 calculates the number of pixels with a high edge strength within the region and the accumulated value of the edge strength within the region.

Furthermore, an average value is calculated by dividing the accumulated value by the number of pixels with a high edge strength, and the resulting average value is used in processing described below.

The average value of the edge strength=the accumulated value/the number of pixels with a high edge strength. Note that, when the number of pixels with a high edge strength is zero, namely, when there are no pixels for which the value of the calculated frequency component exceeds the high frequency threshold value, the average value of the edge strength is considered to be zero.

The threshold determination portion 107 compares the number of pixels and the accumulated value with predetermined threshold values and thus determines whether or not an abnormality has occurred in the region set as the target of processing. The threshold determination portion 107 uses the following determination formulas.

No. of pixels whose edge strength is higher than threshold value<threshold value of No. of pixels (defocus consensus rate) Determination formula 1

Average value of edge strength<threshold value of edge strength value (defocus noise th) Determination formula 2

Determination formula 1 is a formula to determine whether or not there are a great number of pixels with a low edge strength. If the focus of the surveillance camera is blurred, a blurred image is captured, and thus, edge themselves are blurred and it is possible that the region will have a great number of pixels with a low edge strength. Determination formula 1 is a formula used to detect this type of situation.

Determination formula 2 is a formula to determine whether or not the region has low edge strength as a whole. When the surveillance camera focus is not blurred, a focused image is captured, and thus, in a region where edges exist, the accumulated value of the edge strength is high, and the number of pixels with a high edge strength tends to decrease. Therefore, in a predetermined region of the focused image, the average value of the edge strength tends to be a high value.

In contrast to this, if the focus of the surveillance camera is blurred, a blurred image is captured. Thus, it becomes an image (region) from which it is difficult to extract edges and is a blurred image in which the edges are spread out. In this type of region, even if it is a region in which edges exist, the accumulated value of the edge strength is low, and the number of pixels with a high edge strength tends to increase. Thus, in a predetermined region of the image that is not focused, the average value of the edge strength tends to be a low value.

When at least one of either determination formula 1 or determination formula 2 is satisfied, the threshold determination portion 107 determines that there is an abnormality in the region that is the target of processing. In other words, the threshold determination portion 107 takes a logical sum of determination formula 1 and determination formula 2 and outputs the logical sum as a determination result to the counter portion 110 (refer to FIG. 5) which performs later processing.

Figure 17:
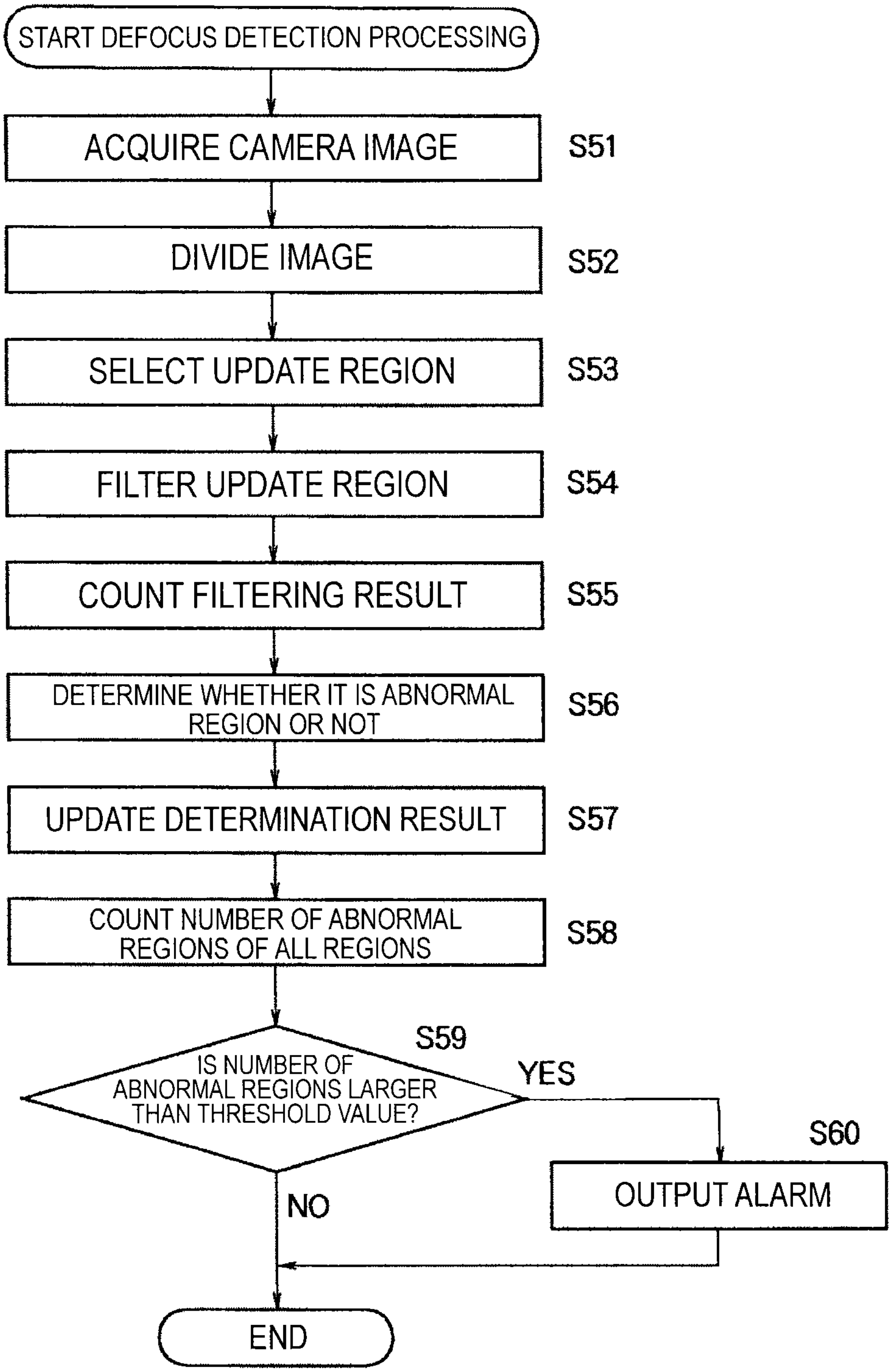
FIG. 17 is a flowchart illustrating processing of the defocus detection portion.

Returning to the explanation of the flowchart in FIG. 17, when it is determined at step S56 whether or not the region is an abnormal region, the abnormal region storage portion 108 updates the determination result for each of the update target blocks of the current frame, at step S57. Specifically, the abnormal region storage portion 108 stores the determination results (namely, the determination results of the number of blocks) of 1 frame for each block, and updates the old determination results with the determination results determined at step S56.

At step S58, the counter portion 110 counts the number of abnormal regions of all the regions. More specifically, based on the determination result (the presence or absence of abnormality) from the abnormality determination portion 105 for the update target blocks of the current frame, and on the determination result from the abnormal region storage portion 108 for the blocks other than the update target blocks of the current frame, the number of blocks are counted that are considered to be abnormal regions from among the total of 64 blocks that form the frame of the image of the surveillance target.

At step S59, the threshold determination portion 111 determines whether or not the counted number of abnormal regions is greater than a threshold value. More specifically, at step S59, the number of blocks that are counted as the abnormal regions is compared to the predetermined threshold value Thc that is set in advance. Here, the explanation continues on the assumption that the comparison is made with the predetermined threshold value Thc that is set in advance, but the threshold value Thc can be a number of abnormal regions of a frame a predetermined number of frames previously.

When it is determined at step S59 that the counted number of abnormal regions is larger than the threshold value, the processing advances to step S60 and the threshold determination portion 111 outputs a signal, such as an alarm or the like, that indicates that an act of sabotage has been committed. Note that the alarm output at step S60 is a signal notifying to latter processing portions that it is possible that an act of sabotage has been committed. When it is determined at step S59 that the counted number of abnormal regions is equal to or less than the threshold value, and after the processing at step S60, the defocus detection processing ends.

The above-described processing is performed for each frame.

In this way, the defocus detection portion 42 can accurately detect defocus-related sabotage, such as blurring the focus of the surveillance camera or blurring the zoom.

Integration of Sabotage Detection

Here, the explanation will once again refer to FIG. 2. As shown in FIG. 2, in the present embodiment, among acts of sabotage committed against the surveillance camera, an act of sabotage relating to a global change is detected by the global change detection portion 41 and a defocus-related act of sabotage is detected by the defocus detection portion 42. Further, the detection result integration portion 43 is provided, which integrates results detected by each of the detection portions and outputs a final result as to the presence or absence of the sabotage.

The detection result integration portion 43 stores, for example, a table such as that shown in FIG. 18, integrates the results from the two detection portions based on the table and outputs a final result. As can be seen from FIG. 18, when the detection result from the global change detection portion 41 is a result indicating no abnormality, and the detection result from the defocus detection portion 42 is also a result indicating no abnormality, the final determination is that of no abnormality.

When the detection result from the global change detection portion 41 is a result indicating no abnormality, and the detection result from the defocus detection portion 42 is a result indicating an abnormality, it is determined that focus blurring sabotage has occurred.

When the detection result from the global change detection portion 41 is a result indicating an abnormality, a histogram abnormality is a result indicating an abnormality in which luminance changes in a same direction, and the detection result from the defocus detection portion 42 is a result indicating no abnormality, it is determined that sabotage of turning the surveillance camera has occurred.

When the detection result from the global change detection portion 41 is a result indicating an abnormality, the histogram abnormality is a result indicating an abnormality in which the luminance changes in the same direction, and the detection result from the defocus detection portion 42 is a result indicating an abnormality, it is determined that sabotage of covering the surveillance camera has occurred.

When the detection result from the global change detection portion 41 is a result indicating an abnormality, the histogram abnormality is a result indicating an abnormality in which the luminance changes in a plurality of directions, and the detection result from the defocus detection portion 42 is a result indicating no abnormality, it is determined that sabotage of turning the surveillance camera has occurred.

When the detection result from the global change detection portion 41 is a result indicating an abnormality, the histogram abnormality is a result indicating an abnormality in which the luminance changes in the plurality of directions, and the detection result from the defocus detection portion 42 is a result indicating an abnormality, it is determined that zoom blurring sabotage has occurred.

Processing of the detection result integration portion 43, which is performed when the detection results are integrated and a final determination result is output based on the above type of table, will be explained with reference to a flowchart shown in FIG. 19. Note that, here, an example of the processing will be given and the order of the determination etc. is not limited to this example.

At step S71, it is determined whether or not the determination result from the global change detection portion 41 indicates detection of sabotage. When it is determined at step S71 that a global change has not been detected, the processing advances to step S72. At step S72, it is determined whether or not the determination result from the defocus detection portion 42 indicates detection of sabotage. When it is determined at step S72 that defocusing has not been detected, the processing advances to step S73.

In this case, as both the global change and the defocusing have not been detected, it is determined that sabotage against the surveillance camera has not been detected, and it is determined that there is no abnormality.

On the other hand, when at step S72 it is determined that defocusing has been detected, the processing advances to step S74. In this case, the global change has not been detected but the defocusing has been detected, and thus sabotage against the surveillance camera is detected and the sabotage is determined to be that of focus blurring.

In the case of focus blurring sabotage, there is a possibility that the luminance of the image of the surveillance camera does not significantly change, and sometimes it is not detected by the global change detection portion 41 that the sabotage has occurred. However, as the edge strength tends to decrease, the defocus detection portion 42 detects that the sabotage has occurred. Thus, at step S74, it is determined that the focus blurring sabotage has occurred.

This determination result is notified to an administrator who manages the surveillance camera. When the notification is made, it is possible to notify not simply that the sabotage has occurred, but also to notify that the sabotage is the focus blurring.

By making it possible to notify the type of sabotage in the manner described above, the administrator can rapidly perform appropriate processing in response to the type of sabotage. For example, when notification is made that focus blurring has occurred, it is possible to more rapidly ascertain that it is appropriate to take action to recover the focus than in a case in which it is simply notified that the sabotage has occurred, and the action in response to the sabotage can be taken more quickly. Furthermore, when the surveillance camera has a function to perform focusing without any command from the administrator, the surveillance camera can start control to perform focusing at the point in time at which the focus blurring sabotage is detected. This type of control can be performed only when the type of sabotage can be determined.

Figure 19:
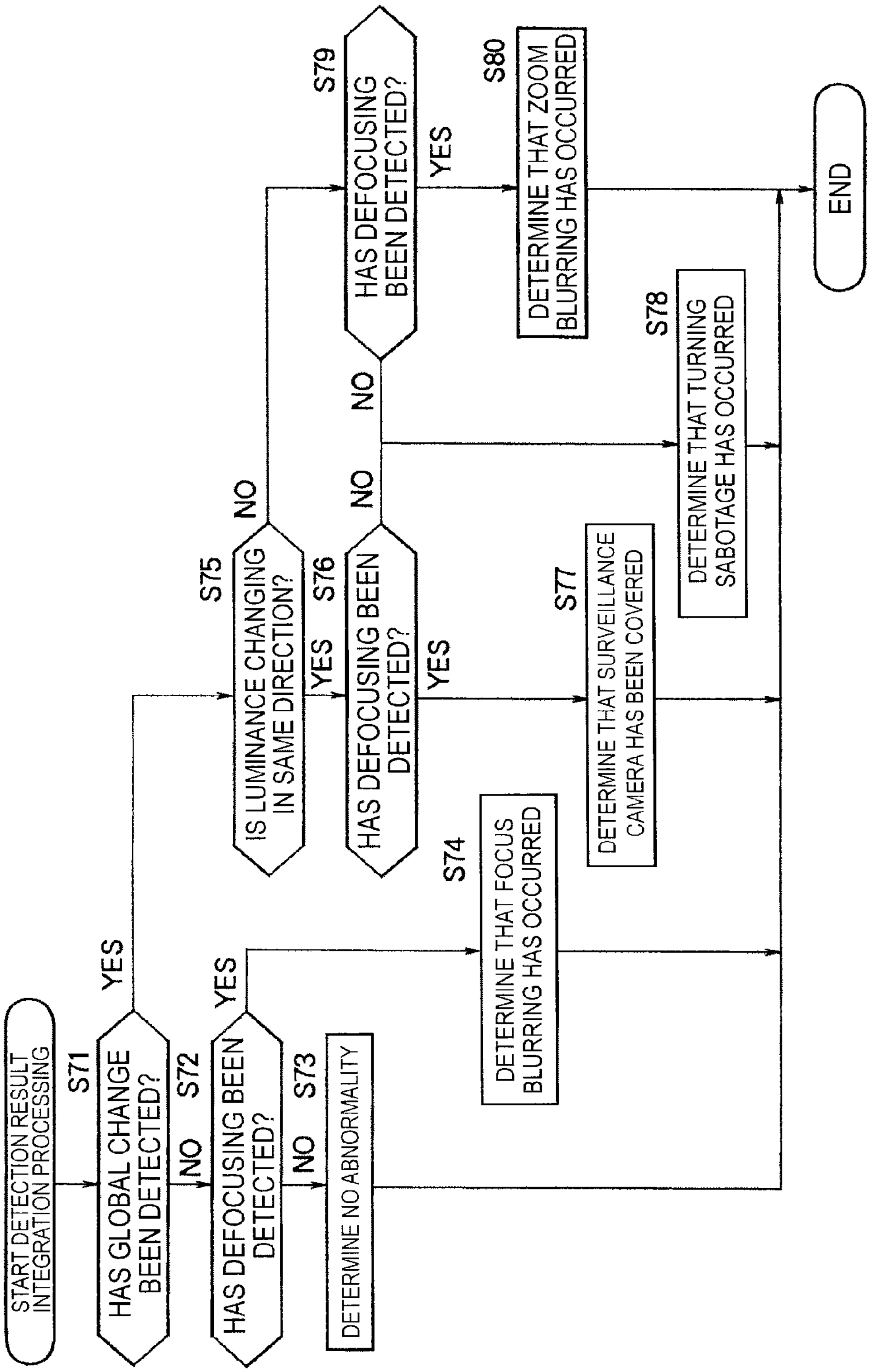
FIG. 19 is a flowchart illustrating the integration of the detection results.

Returning to the explanation of the flowchart shown in FIG. 19, when a global change is detected at step S71, the processing advances to step S75. At step S75, it is determined whether or not the luminance is changing in the same direction. When it is determined at step S75 that the luminance is changing in the same direction, the processing advances to step S76. At step S76, it is determined whether or not defocusing has been detected.

When it is determined at step S76 that the defocusing has been detected, the processing advances to step S77. In this case, the global change has been detected in which the luminance changes in the same direction, and the defocusing is also detected. In this type of situation, it is determined that the so-called covering sabotage has occurred in which the surveillance camera is covered with a cloth or the like.

When the surveillance camera is covered by the cloth or the like, the luminance values tend to change uniformly. Thus, the global change detection portion 41 detects the abnormality in which the luminance changes in the same direction. Further, when the surveillance camera is covered by the cloth or the like, edges disappear (decrease) from the image captured by the surveillance camera, and there is a high probability that the edge strength will decrease.

Thus, the global change detection portion 41 and the defocus detection portion 42 each output the determination result indicating that there is an abnormality. Further, if the global change detection portion 41 detects the abnormality in which the luminance changes in the same direction, it is possible to determine that the covering sabotage has occurred. In this case also, it is possible to notify not simply that the sabotage has occurred but also to notify that the sabotage is the covering sabotage. It is thus possible to reduce an amount of time until the administrator takes action.

Furthermore, a method to take action may be notified when performing the notification. For example, when this type of covering sabotage is detected, a message such as, "Covering sabotage has occurred, please remove the covering cloth etc. urgently" may be used as the notification when the sabotage occurs. In addition, an action may be taken in which video is switched to another surveillance camera that is caused to film the vicinity of the surveillance camera that has detected the occurrence of the sabotage.

On the other hand, when it is determined at step S76 that the defocusing has not been detected, the processing advances to step S78. In this case, the global change in which the luminance changes in the same direction has been detected, but the defocusing has not been detected. In this type of situation, it is determined that the turning sabotage has occurred in which the direction of the surveillance camera is changed to another direction.

In the case of turning, as the direction of the surveillance camera is changed, the captured image is different to the image captured before the turning occurs. Thus, luminance values change, and the global change detection portion 41 detects that sabotage has occurred. However, if the image captured by the surveillance camera that has been turned is also in a focused state, the change in edge strength is small, and sometimes the sabotage is not detected by the defocus detection portion 42. Even in this type of case, by providing the global change detection portion 41 and the defocus detection portion 42, the sabotage can be detected by the global change detection portion 41 and it can also be determined that the sabotage is the turning of the surveillance camera.

In this case also, it is possible to notify not simply that the sabotage has occurred, but also to notify that the sabotage is the turning of the surveillance camera. It is thus possible to reduce an amount of time until the administrator takes action. When the surveillance camera has been turned, the administrator can go to the location in which the surveillance camera is installed and return the surveillance camera to its correct position. If the surveillance camera has a function that can control panning and tilting by remote operation, the administrator can return the surveillance camera to its correct position by remote operation.

On the other hand, when it is determined at step S75 that the luminance is not changing in the same direction, namely, when it is determined that the luminance is changing in the plurality of directions, the processing advances to step S79. At step S79, it is determined whether or not defocusing has been detected. At step S79, when it is determined that defocusing has been detected, the processing advances to step S80.

In this case, the global change has been detected in which the luminance changes in the plurality of directions, and the defocusing has also been detected. In this type of situation, it is determined that the zoom of the surveillance camera has been put out of focus, referred to above as zoom blurring. If the zoom of the surveillance camera is out of focus, the image being captured changes and there is a high possibility that the luminance values will change. However, in contrast to a case in which the surveillance camera is covered with a cloth or the like, the possibility that the luminance values change uniformly is low. Thus, the global change detection portion 41 detects the abnormality in which the luminance changes in the plurality of directions.

Furthermore, when the zoom of the surveillance camera is out of focus, as the image being captured changes, there is a high possibility that edge strength will also change. Thus, the abnormality is also detected by the defocus detection portion 42. In this type of situation, it is determined that the zoom blurring sabotage has occurred.

In this case also, it is possible to notify not simply that the sabotage has occurred, but also to notify that the sabotage is the zoom blurring. It is thus possible to reduce an amount of time until the administrator takes action. The administrator can go to the location in which the surveillance camera is installed and restore the zoom to its correct position. If the surveillance camera has a function that can control the zoom by remote operation, the administrator can restore the zoom to its correct position by remote operation.

On the other hand, when it is determined at step S79 that the defocusing has not been detected, the processing advances to step S78. In this case, the global change has been detected in which the luminance changes in the plurality of directions, but defocusing has not been detected. In this type of situation, it is determined that turning sabotage has occurred, in which the orientation of the surveillance camera has been changed to another direction.

In this case also, it is possible to notify not simply that the sabotage has occurred, but also to notify that the sabotage is the turning of the surveillance camera. It is thus possible to reduce an amount of time until the administrator takes action.

By integrating the determination result from the global change detection portion 41 and the determination result from the defocus detection portion 42 in this way, it is possible to not simply detect that sabotage has been committed against the surveillance camera, but also to detect what type of sabotage the sabotage is. Furthermore, the global change detection portion 41 and the defocus detection portion 42 each detect the sabotage and it is thus possible to reduce detection oversights and mistaken detection.

As it is possible to detect the type of sabotage, it is also possible to notify the type of sabotage to the administrator. Thus, it is easy for the administrator to take action against the sabotage. Depending on the type of sabotage, there are cases in which the sabotage is resolved on the surveillance camera side. In this type of case, by knowing the type of sabotage, the surveillance camera itself can determine whether or not it can resolve the sabotage. When the camera can resolve the sabotage, it can start to resolve the sabotage without waiting for instructions from the administrator.

In addition, in the above-described embodiment, the global change detection portion 41 and the defocus detection portion 42 each divide the single image into the plurality of regions and determine, for each region, whether or not there is a possibility that sabotage has occurred. Then, using the determination result for each of the regions, a determination is made as to whether the sabotage has occurred with respect to the single image. As a result, for example, even in an image having some regions in which edge strength is extremely high, it is possible to perform sabotage detection without relying on those regions. In other words, it is possible to perform more accurate sabotage detection.

[Recording Medium]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 20:
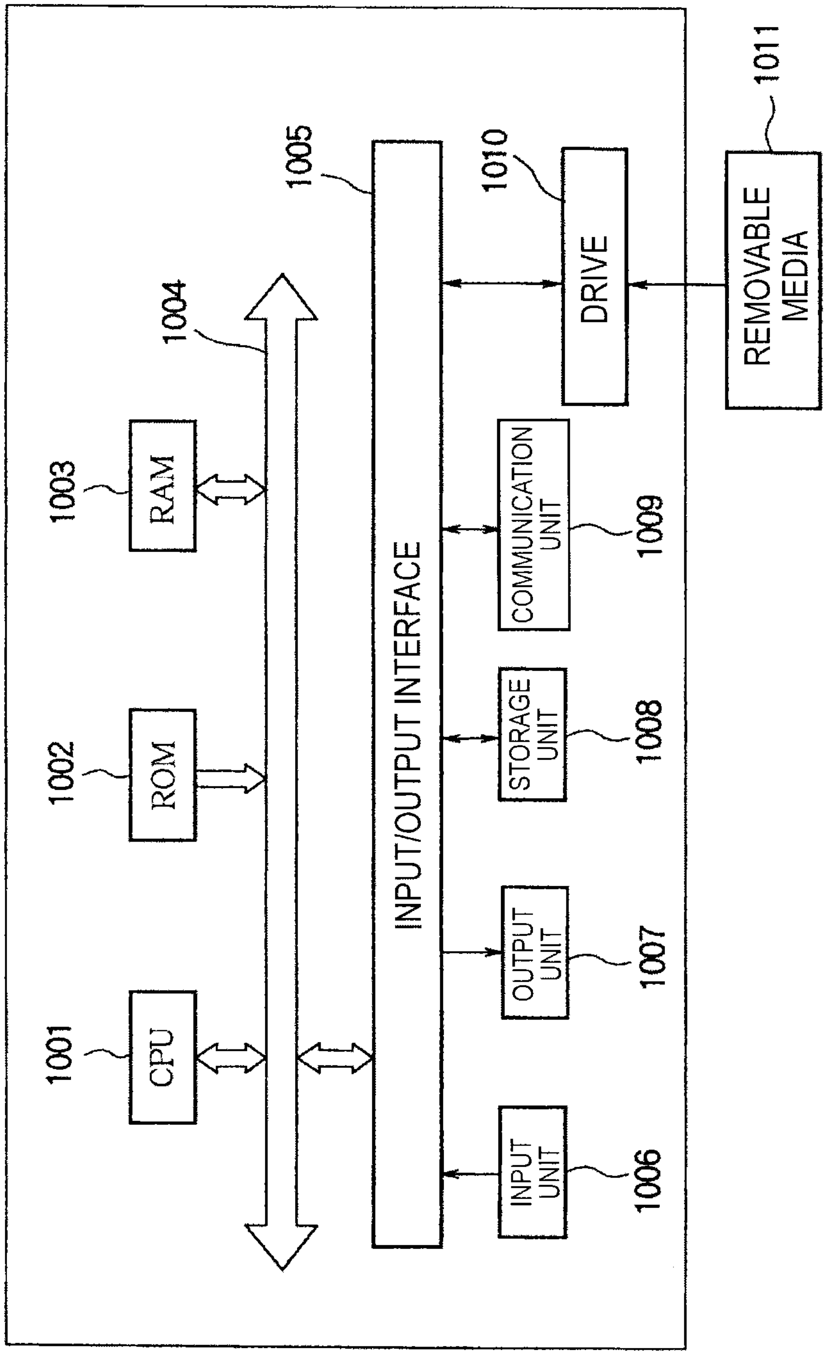
FIG. 20 is a diagram illustrating a recording medium.

FIG. 20 is a block diagram showing a hardware configuration example of a computer that performs the above-described series of processing using a program.

In the computer, a central processing unit (CPU) 1001, a read only memory (ROM) 1002 and a random access memory (RAM) 1003 are mutually connected by a bus 1004. An input/output interface 1005 is also connected to the bus 1004. An input unit 1006, an output unit 1007, a storage unit 1008, a communication unit 1009 and a drive 1010 are connected to the input/output interface 1005.

The input unit 1006 is configured from a keyboard, a mouse, a microphone or the like. The output unit 1007 configured from a display, a speaker or the like.

The storage unit 1008 is configured from a hard disk, a non-volatile memory or the like. The communication unit 1009 is configured from a network interface or the like. The drive 1010 drives a removable media 1011 such as a magnetic disk, an optical disk, a magneto-optical disk, a semiconductor memory or the like.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable media 1011 which is a packaged media or the like. Also, programs may be provided via a wired or wireless transmission medium, such as a local area network, the Internet or digital satellite broadcasting.

In the computer, by inserting the removable media 1011 into the drive 1010, the program can be installed in the storage unit 1008 via the input/output interface 1005. Further, the program can be received by the communication unit 1009 via a wired or wireless transmission media and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in this specification, "system" refers to a whole device composed of a plurality of devices.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:

an acquisition portion that acquires image data of an image;

a dividing portion that divides the acquired image into a number of blocks N (N>1);

a specification portion that sequentially specifies, each time the image data of the image is newly acquired, a number of the blocks M (N≥M>1) from among the number of the blocks N, as the blocks to be updated;

a filtering portion that performs filtering using a predetermined filter on the image data of the specified number of the blocks M;

a counting portion that counts a number of pixels for which a filtering result from the filtering portion is larger than a predetermined value;

a first determination portion that determines whether there is an abnormality in the blocks, by comparing the number of the pixels counted by the counting portion with a predetermined value; and a second determination portion that determines whether sabotage has occurred, by comparing, with a predetermined value, a number of the blocks within the image that are determined by the first determination portion to have an abnormality.

(2) The image processing device according to (1), wherein the counting portion calculates an average value by dividing a sum value of the number of pixels obtained by counting the number of the pixels for which the filtering result is larger than the predetermined value, and a value of pixels for which it is determined that the filtering result is equal to or larger than the predetermined value, by the number of pixels, and wherein the first determination portion performs a first determination that determines whether the number of pixels is smaller than a predetermined value, and a second determination that determines whether the average value is smaller than a predetermined value, and sets a logical sum of the first determination and the second determination as a determination result.

(3) The image processing device according to (1) or (2), further including:

a histogram generation portion that generates a histogram of the image data of each of the specified number of the blocks M;

a histogram storage portion that sequentially updates and stores the generated histogram;

a change determination portion that, based on a degree of similarity between the generated histogram of each of the specified number of the blocks M and the corresponding stored past histogram of the number of the blocks M, determines whether there is a change in the acquired image;

a normalization determination portion that determines whether to perform normalization of the histogram; and a normalization portion that, when it is determined by the normalization determination portion that normalization is to be performed, performs normalization of one of the generated histogram of the number of the blocks M or the corresponding stored past histogram of the number of the blocks M, wherein, when the normalization of the histogram has been performed by the normalization portion, the change determination portion determines whether there is a change in the acquired image based on a degree of similarity using the normalized histogram, and determines that sabotage has occurred when it is determined that there is a change.

(4) The image processing device according to (3), wherein a determination result by the second determination portion and a determination result by the change determination portion are integrated and a type of the sabotage is determined.

(5) An image processing method including:

acquiring image data of an image;

dividing the acquired image into a number of blocks N (N>1);

sequentially specifying, each time the image data of the image is newly acquired, a number of the blocks M (N≥M>1) from among the number of the blocks N, as the blocks to be updated;

performing filtering using a predetermined filter on the image data of the specified number of the blocks M;

counting a number of pixels for which a filtering result is larger than a predetermined value;

determining whether there is an abnormality in the blocks, by comparing the counted number of the pixels with a predetermined value; and determining whether sabotage has occurred, by comparing, with a predetermined value, a number of the blocks within the image that are determined to have an abnormality.

(6) A computer-readable program including instructions that command a computer to perform:

acquiring image data of an image;

dividing the acquired image into a number of blocks N (N>1);

sequentially specifying, each time the image data of the image is newly acquired, a number of the blocks M (N≥M>1) from among the number of the blocks N, as the blocks to be updated;

performing filtering using a predetermined filter on the image data of the specified number of the blocks M;

counting a number of pixels for which a filtering result is larger than a predetermined value;

determining whether there is an abnormality in the blocks, by comparing the counted number of the pixels with a predetermined value; and determining whether sabotage has occurred, by comparing, with a predetermined value, a number of the blocks within the image that are determined to have an abnormality.

The present disclosure contains subject matter related to that disclosed in Japanese Priority Patent Application JP 2011-177569 filed in the Japan Patent Office on Aug. 15, 2011, the entire content of which is hereby incorporated by reference.

What is claimed is:

1. An image processing device comprising:

an acquisition portion that acquires image data of an image;

a dividing portion that divides the acquired image into a number of blocks N (N>1);

a specification portion that sequentially specifies, each time the image data of the image is newly acquired, a number of the blocks M (N≥M>1) from among the number of the blocks N, as the blocks to be updated;

a filtering portion that performs filtering using a predetermined filter on the image data of the specified number of the blocks M;

a counting portion that counts a number of pixels for which a filtering result from the filtering portion is larger than a predetermined value;

a first determination portion that determines whether there is an abnormality in the blocks, by comparing the number of the pixels counted by the counting portion with a predetermined value; and a second determination portion that determines whether sabotage has occurred, by comparing, with a predetermined value, a number of the blocks within the image that are determined by the first determination portion to have an abnormality.

2. The image processing device according to claim 1, wherein the counting portion calculates an average value by dividing a sum value of the number of pixels obtained by counting the number of the pixels for which the filtering result is larger than the predetermined value, and a value of pixels for which it is determined that the filtering result is equal to or larger than the predetermined value, by the number of pixels, and wherein the first determination portion performs a first determination that determines whether the number of pixels is smaller than a predetermined value, and a second determination that determines whether the average value is smaller than a predetermined value, and sets a logical sum of the first determination and the second determination as a determination result.

3. The image processing device according to claim 1, further comprising:

a histogram generation portion that generates a histogram of the image data of each of the specified number of the blocks M;

a histogram storage portion that sequentially updates and stores the generated histogram;

a change determination portion that, based on a degree of similarity between the generated histogram of each of the specified number of the blocks M and the corresponding stored past histogram of the number of the blocks M, determines whether there is a change in the acquired image;

a normalization determination portion that determines whether to perform normalization of the histogram; and a normalization portion that, when it is determined by the normalization determination portion that normalization is to be performed, performs normalization of one of the generated histogram of the number of the blocks M or the corresponding stored past histogram of the number of the blocks M, wherein, when the normalization of the histogram has been performed by the normalization portion, the change determination portion determines whether there is a change in the acquired image based on a degree of similarity using the normalized histogram, and determines that sabotage has occurred when it is determined that there is a change.

4. The image processing device according to claim 3, wherein a determination result by the second determination portion and a determination result by the change determination portion are integrated and a type of the sabotage is determined.

5. An image processing method comprising:

acquiring image data of an image;

dividing the acquired image into a number of blocks N (N>1);

sequentially specifying, each time the image data of the image is newly acquired, a number of the blocks M (N≥M>1) from among the number of the blocks N, as the blocks to be updated;

performing filtering using a predetermined filter on the image data of the specified number of the blocks M;

counting a number of pixels for which a filtering result is larger than a predetermined value;

determining whether there is an abnormality in the blocks, by comparing the counted number of the pixels with a predetermined value; and determining whether sabotage has occurred, by comparing, with a predetermined value, a number of the blocks within the image that are determined to have an abnormality.

6. A non-transitory computer-readable medium having stored thereon a program that when executed by a computer causes the computer to implement instructions that command the computer to perform:

acquiring image data of an image;

dividing the acquired image into a number of blocks N (N>1);

sequentially specifying, each time the image data of the image is newly acquired, a number of the blocks M (N≥M>1) from among the number of the blocks N, as the blocks to be updated;

performing filtering using a predetermined filter on the image data of the specified number of the blocks M;

counting a number of pixels for which a filtering result is larger than a predetermined value;

determining whether there is an abnormality in the blocks, by comparing the counted number of the pixels with a predetermined value; and determining whether sabotage has occurred, by comparing, with a predetermined value, a number of the blocks within the image that are determined to have an abnormality.

* * * * *